United States Patent [19]
Okuyama et al.

[11] Patent Number: 5,290,323
[45] Date of Patent: Mar. 1, 1994

[54] MANUFACTURING METHOD FOR SOLID-ELECTROLYTE FUEL CELL

[75] Inventors: Ryoichi Okuyama; Eiichi Nomura, both of Takatsuki, Japan

[73] Assignee: Yuasa Corporation, Osaka, Japan

[21] Appl. No.: 915,699

[22] PCT Filed: Dec. 9, 1991

[86] PCT No.: PCT/JP91/01701
§ 371 Date: Jul. 29, 1992
§ 102(e) Date: Jul. 29, 1992

[87] PCT Pub. No.: WO92/10862
PCT Pub. Date: Jun. 25, 1992

[30] Foreign Application Priority Data

| Dec. 10, 1990 | [JP] | Japan | 2-409997 |
| Dec. 14, 1990 | [JP] | Japan | 2-410959 |
| Dec. 17, 1990 | [JP] | Japan | 2-411402 |
| Dec. 18, 1990 | [JP] | Japan | 2-412014 |
| Jan. 29, 1991 | [JP] | Japan | 3-29539 |
| Jan. 29, 1991 | [JP] | Japan | 3-29540 |
| Feb. 15, 1991 | [JP] | Japan | 3-44367 |
| Feb. 28, 1991 | [JP] | Japan | 3-59368 |
| Feb. 28, 1991 | [JP] | Japan | 3-59369 |
| Mar. 11, 1991 | [JP] | Japan | 3-72352 |
| Mar. 23, 1991 | [JP] | Japan | 3-83260 |
| Mar. 23, 1991 | [JP] | Japan | 3-83261 |
| Jul. 24, 1991 | [JP] | Japan | 3-208684 |
| Jul. 24, 1991 | [JP] | Japan | 3-208685 |
| Aug. 26, 1991 | [JP] | Japan | 3-240466 |
| Sep. 20, 1991 | [JP] | Japan | 3-270055 |
| Oct. 3, 1991 | [JP] | Japan | 3-284031 |
| Oct. 7, 1991 | [JP] | Japan | 3-289148 |

[51] Int. Cl.$^5$ ............................................. H07M 8/10
[52] U.S. Cl. ................................. 29/623.5; 427/115; 429/30
[58] Field of Search ............................. 29/623.4, 623.5; 427/115; 429/30

[56] References Cited

U.S. PATENT DOCUMENTS

| 3,377,203 | 4/1968 | Mobius et al. |
| 3,843,400 | 10/1974 | Radford et al. ............ 117/227 |
| 4,782,392 | 11/1988 | Haycock et al. ............ 358/183 |
| 4,957,673 | 9/1990 | Schroeder et al. |

FOREIGN PATENT DOCUMENTS

| 0134136 | 3/1985 | European Pat. Off. |
| 49-76038 | 7/1974 | Japan. |
| 61-216258 | 9/1986 | Japan. |
| 1-110904 | 10/1987 | Japan. |
| 62-268063 | 11/1987 | Japan. |
| 64-7475 | 1/1989 | Japan. |
| 1-93065 | 4/1989 | Japan. |
| 3-81972 | 4/1991 | Japan. |
| 3-101065 | 4/1991 | Japan. |
| 1048839 | 11/1962 | United Kingdom. |

Primary Examiner—Stephen Kalafut
Attorney, Agent, or Firm—Armstrong, Westerman, Hattori, McLeland & Naughton

[57] ABSTRACT

This invention relates to a manufacturing method for a solid-electrolyte fuel cell having a three-layer structure and equipped with a fuel-electrode and an air-electrode for its electrodes with a solid-electrolyte sandwiched between them. A mold (4) comprising a material having a property to suck a specified solvent is used. A slurry is made up by mixing a solid-electrolyte powder and an electrode powder to the same solvent as the above specified solvent, and the slurry is poured in turn in the mold to form an electrolyte green body (5) and electrode green bodies (6) and (7). Thereby, a solid-electrolyte fuel cell including no crack and peeling-off in each layer can be obtained easily and inexpensively.

27 Claims, 19 Drawing Sheets

MANUFACTURING METHOD FOR SOLID-ELECTROLYTE FUEL CELL

TECHNICAL FIELD

This invention relates to a manufacturing method for a solid-electrolyte fuel cell (solid-oxide fuel cell) having a three-layer structure and equipped with a fuel-electrode and an air-electrode with a solid-electrolyte sandwiched between them.

1. Background Art

A planar type fuel cell having a structure similar to a phosphoric acid fuel cell or a molten carbonate fuel cell, a monolithic type fuel cell proposed by Argonne National Laboratory of U.S.A., a tubular multi-component type fuel cell under development by Electrotechnical Laboratory of Japan, and a tubular single-component type proposed by Westinghouse Co. of U.S.A. etc. have been known as the solid-electrolyte fuel cell. However, the tubular single-component type fuel cell proposed by Westinghouse Co. becomes the object of public attention at present owing to its easiness of gas sealing at high temperature and simpleness of stack structure.

A plasma spray method, a chemical vapor deposition method (CVD), an electrochemical vapor deposition method (EVD) and a spray pyrolysis method of organometallic zirconium salt etc. have been known as the manufacturing method for solid-electrolyte for use in such the solid-electrolyte fuel cells. However, only the plasma spray method and the electrochemical vapor deposition method (EVD) are the method for obtaining a dense solid-electrolyte film.

In the foregoing plasma spray method and an electrochemical vapor deposition method (EVD), an expensive manufacturing equipment is necessary and a lot of time is required in masking work for forming a part requiring the solid-electrolyte film and a part not requiring the film. Therefore, there has been a technical problem in mass-production of fuel cell.

Further, as another method for obtaining the dense solid-electrolyte film, there has been tried a method as shown by FIG. 55, in which a stabilized zirconia powder 110 is formed into a slurry, applied on a support material 100 and then sintered In the method shown by FIG. 55, however, particles of the stabilized zirconia powder 110 shrink at the time of sintering. Therefore, there have been problems that a crack 130 has been produced on a solid-electrolyte film 120 formed on the support material 100 and that the solid-electrolyte film 120 has been peeled off.

2. Disclosure of the Invention

A principal object of this invention is to provide a solid-electrolyte fuel cell having a three-layer structure, which can be manufactured inexpensively and easily without producing a crack and a peeling-off in each layer.

The present invention provides a manufacturing method for a solid-electrolyte fuel cell equipped with a fuel-electrode and an air-electrode for its electrodes with a solid-electrolyte sandwiched between them; characterized by that the method comprises a process in which a slurry is poured into a concave portion of a mold composed of a material having a property to suck a specified solvent so as to form an electrolyte green body, the slurry being made up by mixing a solid-electrolyte powder to the same solvent as the above specified solvent, a process in which a slurry is poured into the concave portion to form an electrode green body so as to form a multi-layer green body integrated with the electrolyte green body, the slurry being prepared by mixing an electrode powder to the same solvent as the above specified solvent, and a process in which the multi-layer green body is removed the mold from it and then sintered; and the electrode green body formed in the above concave portion is one or both of a fuel-electrode green body and an air-electrode green body.

In the present invention, since the specified solvent of the slurry is sucked in the mold, the electrolyte green body and the electrode green body are formed under a stable condition so that they are not cracked and peeled off. Further, the principal work is pouring and sintering of the slurry in this invention so that the manufacturing method is easy, and the mold and a device for sintering etc. are required at most so that this method is inexpensive.

BEST MODE FOR CARRYING OUT THE INVENTION

Embodiment 1

Figure 1:
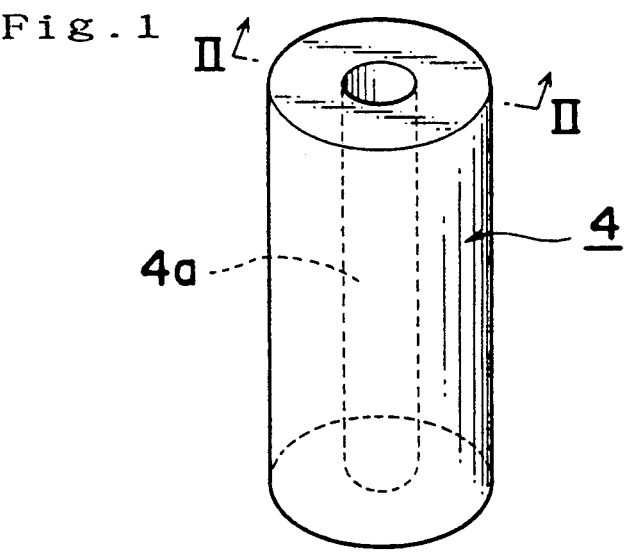
FIG. 1 is a perspective view showing a mold for common use in each embodiment of this invention.
Figure 2:
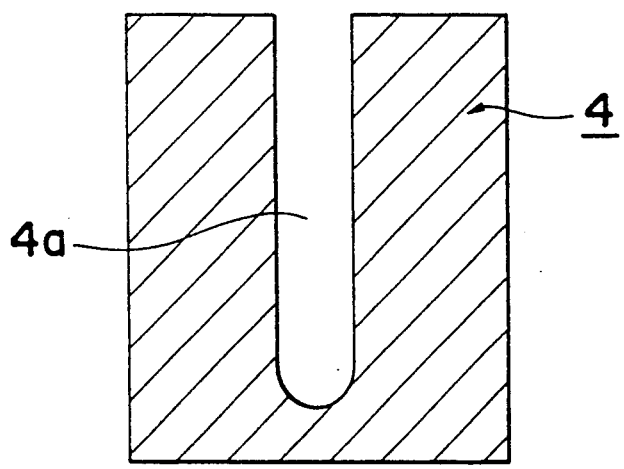
FIG. 2 is a sectional view taken on a line II—II of FIG. 1.

FIG. 1 is a perspective view of a mold 4 for use in this embodiment, and FIG. 2 is the sectional view taken on the line II—II of FIG. 1. The mold 4 is made of a plaster which is a material having water absorptivity and includes a concave portion 4a. The concave portion 4a is composed of a cylindrical space having a round bottom portion.

Figure 3:
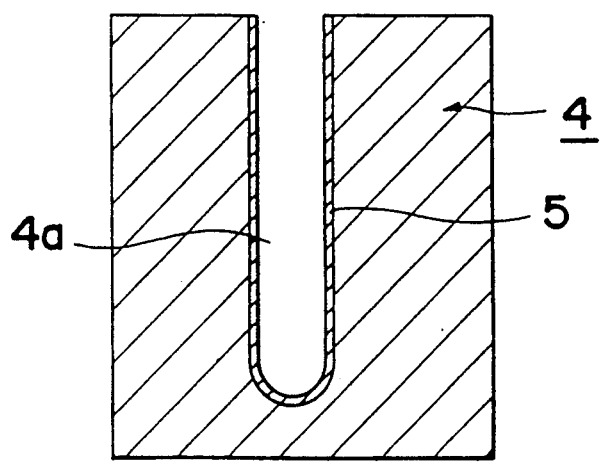
FIG. 3 through FIG. 6 are sectional views for each process of embodiment 1 and embodiment 11.

The manufacturing method of this embodiment is carried out in the following manner by using the mold 4. In the first place; a slurry which comprises a zirconia powder (solid-electrolyte powder) added with yttrium oxide forming a stabilizer, water, a dispersant, a binder and an antifoamer, is prepared. That is, the slurry is prepared by utilizing the water as a solvent. In this slurry, a zirconia having a small grain size is used, and a cubic zirconia is included. Calcium oxide, scandium oxide, ytterbium oxide, neodymium oxide or gadolinium oxide may be used for the stabilizer. The slurry thus prepared is poured into the concave portion 4a of the mold 4 and left as it is for a specified time so as to form an electrolyte green body 5 as shown by FIG. 3, and an excessive slurry is then removed therefrom if existing. The electrolyte green body 5 is formed as a film along an inside surface of the concave portion 4a.

Figure 4:
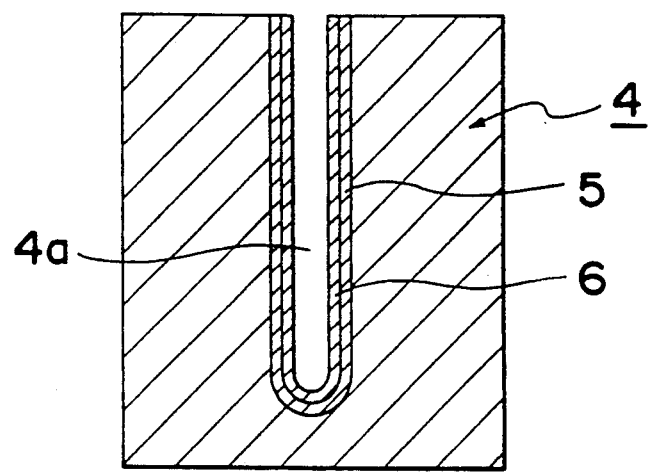

In the next place, a slurry which comprises a nickel oxide powder (fuel-electrode powder) forming a metal oxide, the zirconia powder added with yttrium oxide forming the stabilizer, the water, the dispersant, the binder and the antifoamer, is prepared. In this slurry, a zirconia having a large grain size is used, and especially a tetragonal zirconia and a partial stabilized zirconia are included. The nickel oxide is used for the fuel-electrode powder, however, other metal oxides such as a cobalt oxide or other metals such as nickel, cobalt etc. may be used therefor. The slurry thus prepared is poured onto the electrolyte green body 5 before the electrolyte green body 5 has been dried up and left as it is for a specified time so as to form a fuel-electrode green body 6 as shown by FIG. 4, and an excessive slurry is then removed therefrom if existing. The fuel-electrode green body 6 is formed as a layer along a surface of the electrolyte green body 5.

Figure 5:
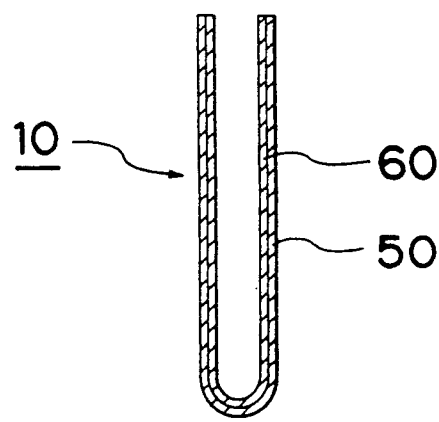

In the third place, the electrolyte green body 5 and the fuel-electrode green body 6 are dried to form a double-layer green body made up by integrating the both, the mold 4 is removed therefrom, and the double-layer green body is sintered to form an electrolyte-electrode composite 10 as shown by FIG. 5. When kind and content of the inclusion, especially the zirconia powder, of the slurry forming the electrolyte green body 5 and the fuel-electrode green body 6 are so determined that thermal expansion coefficients of the both green bodies 5 and 6 are the same level, the above-mentioned sintering can be carried out under a stable condition and the electrolyte-electrode composite 10 can be obtained without producing the crack and peeling-off. In FIG. 5, an outside is a solid-electrolyte film 50, and an inside is a fuel-electrode 60.

Figure 6:
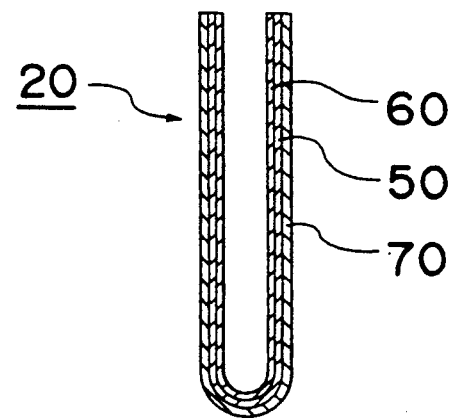

In the fourth place, an air-electrode 70 is to be formed on an outside of the solid-electrolyte film 50 of the electrolyte-electrode composite 10 as shown by FIG. 6. The air-electrode 70 is formed by using a $LaMnO_3$ powder (air-electrode powder) doped with strontium by means of a dipping method. A solid-electrolyte fuel cell 20 having a three-layer structure can thus be obtained, which is equipped with the air-electrode 70 at its outside, the fuel-electrode 60 at its inside and the solid-electrolyte film 50 sandwiched between them. Complex oxides having a perovskite structure other than $LaMnO_3$ such as $LaCoO_3$ and $CaMnO_3$ etc., for example, may be used for the air-electrode powder. Alkaline earth metals other than the strontium such as calcium and rare earth elements, for example, may be used for the doping substance. A slurry coating method and plasma spray method etc. may be used for the forming method.

As described above, in the foregoing manufacturing method, the electrolyte green body 5 and the fuel-electrode green body 6 are formed in this order by using the mold 4, and the mold 4 is then removed therefrom to form the air-electrode 70.

In the above-mentioned manufacturing method, the water forming the solvent of slurry is sucked in the mold 4 so that the electrolyte green body 5 and the fuel-electrode green body 6 are formed under the stable condition so as not to produce the crack and peeling-off in the processes shown by FIG. 3 and FIG. 4. In addition, the solid-electrolyte film 50 and the fuel-electrode 60 can be prepared easily because they are formed by the simple processes such as pouring and sintering of the slurry. Namely, the above-mentioned manufacturing method can be carried out easily. Moreover, the mold 4 and a device for sintering are required at most so that the above-mentioned manufacturing method is inexpensive when applied.

The zirconia having a small grain size is used for the slurry forming the electrolyte green body 5 so that the solid-electrolyte film 50 becomes dense, and the zirconia having a large grain size is used for the slurry forming the fuel-electrode green body 6 so that the fuel-electrode 60 becomes porous. The tetragonal zirconia or the partial stabilized zirconia is specially used for the slurry forming the fuel-electrode green body 6 so that the fuel-electrode green body 6 increases its strength when it is sintered to be formed into the fuel-electrode 60, and the fuel-electrode 60 also has a function as a support material Further, when an addition amount of the stabilizer of zirconia in the slurry for forming the electrolyte green body 5 is varied, a resistance and mechanical strength of the solid-electrolyte film 50 can be controlled. Moreover, thicknesses of the electrolyte green body 5 and the fuel-electrode green body 6 can be controlled at will by changing a time of pouring the slurry and an amount of slurry components. While, the nickel oxide added in the slurry for forming the fuel-electrode green body 6 comes in contact with a fuel to be reduced, so that it produces a function as the fuel-electrode 60.

When the solid-electrolyte fuel cell 20 prepared as described above is raised its temperature from an operation temperature 700° C. up to 1,000° C., and hydrogen or carbon monoxide forming the fuel is supplied to the fuel-electrode 60 side and air is supplied to the air-electrode 70 side; the nickel oxide in the fuel-electrode 60 is reduced by the fuel. Therefore, when the fuel-electrode 60 and the air-electrode 70 of the fuel cell 20 are connected to an external circuit, oxygen supplied from the air-electrode 70 takes in electrons supplied from the external circuit to become oxide ions. The oxide ions diffuse the solid-electrolyte film 50 to reach an interface with the fuel-electrode 60. On the other hand, hydrogen or carbon monoxide diffused through the fuel-electrode 60 exists in the interface, so that this hydrogen or carbon monoxide reacts with the oxide ions to produce steam and carbon dioxide and releases electrons to the external circuit. Accordingly, an electromotive force is thereby generated in the external circuit with the air-electrode 70 serving as a positive electrode and the fuel-electrode 60 as a negative electrode, so that the fuel cell produces a function as a battery.

Figure 7:
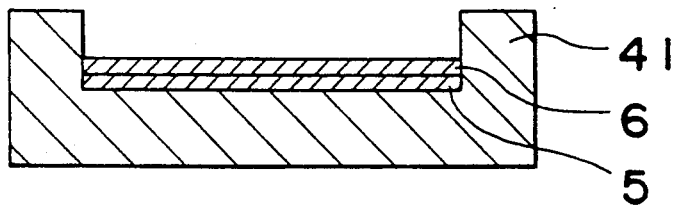
FIG. 7 and FIG. 8 are sectional views for one process showing another example of the embodiment 1, respectively.
Figure 8:
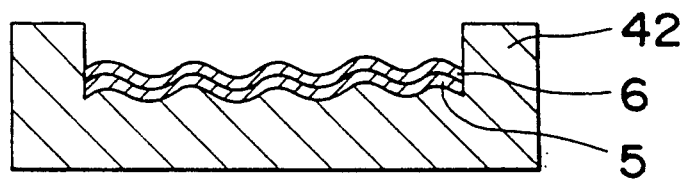

The plaster is used for the material of the mold 4 in the above embodiment, however, any other material may be used therefor so far as it has a water absorptivity. The mold 4 is one for making up the tubular battery. However, a planar type battery can be made up when a mold 41 as shown by FIG. 7 is used, and a monolithic type battery can be made up when a mold 42 as shown by FIG. 8 is used. Further, the slurry of the fuel-electrode green body 6 may be prepared by using the slurry of the electrolyte green body 5.

As described above, in the manufacturing method of this embodiment, the electrolyte green body 5 and the fuel-electrode green body 6 can be formed under the stable condition, and the crack and peeling-off can be prevented. In addition, the solid-electrolyte film 50 and the fuel-electrode 60 can be formed by such a simple procedure that the slurry is poured into the concave portion 4a of the mold 4 to form the electrolyte green body 5 and the fuel-electrode green body 6 which are then sintered, so that the manufacturing method can be carried out easily. Moreover, the mold 4 and a device for sintering are required at most so that the above-mentioned manufacturing method is inexpensive when it is put in use.

Embodiment 2

Figure 9:
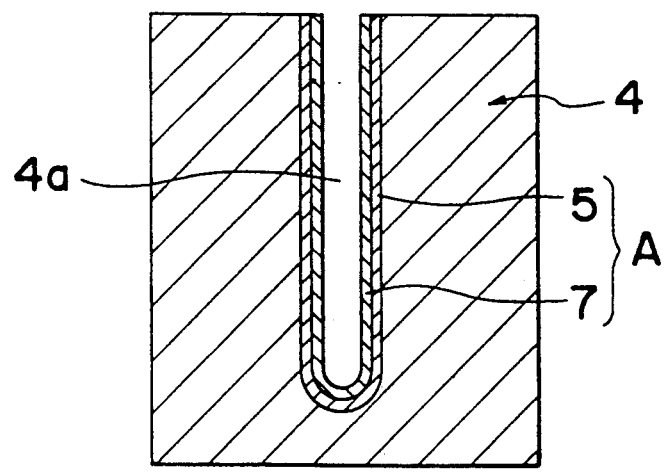
FIG. 9 through FIG. 11 are sectional views for each process of embodiment 2.
Figure 10:
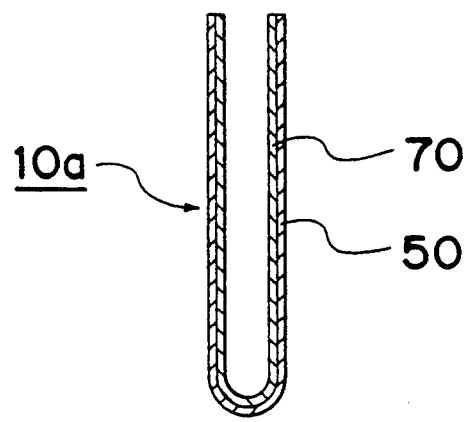

In the manufacturing method of this embodiment, only an order of forming the electrode is different from that of the embodiment 1 and others are similar to those of the embodiment 1. Namely, in this embodiment, the electrolyte green body 5 and an air-electrode green body 7 are formed in this order by using the mold 4, and the mold 4 is then removed therefrom to form the fuel-electrode 60 as shown by FIG. 9 through FIG. 11.

A slurry which comprises a $LaMnO_3$ powder (air-electrode powder) doped with strontium, the zirconia powder added with yttrium oxide forming the stabilizer, the water, the dispersant, the binder and the antifoamer, is prepared. The air-electrode green body 7 is formed by using the above slurry in the same way as forming the fuel-electrode green body 5 of the embodiment 1. In this slurry, the zirconia having a large grain size is used, and the tetragonal zirconia and the partial stabilized zirconia are specially included. As for the air-electrode powder, other materials similar to those of the embodiment 1 may be used. In FIG. 10, 10a is an electrolyte-electrode composite which is formed in such a way that a double-layer green body comprising the electrolyte green body 50 and the air-electrode green body 70 is sintered after removing the mold 4 from it, and its outside is the solid-electrolyte film 50 ad its inside is the air-electrode 70, FIG. 11.

Figure 11:
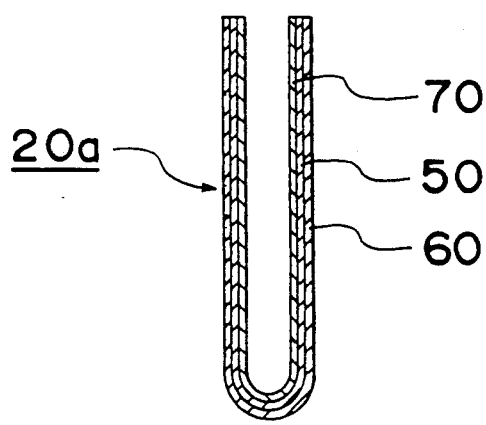

The fuel-electrode 60 FIG. 11 is formed at an outside of the solid-electrolyte film 50 of the electrolyte-electrode composite 10a. *The fuel-electrode 60 is formed by using $Ni-ZrO_2$ cermet by means of the dipping method.* A solid-electrolyte fuel cell 20a having a three-layer structure can thus be prepared as shown by FIG. 11, which is equipped with the fuel-electrode 60 at its outside, the air-electrode 70 at its inside and the solid-electrolyte film 50 sandwiched between them. $Co-ZrO_2$ cermet may be used for the material of the fuel-electrode 60, and the slurry coating method and spray method etc. may be used for the forming method. The material of the fuel-electrode 60 is not limited to the above cermet, but the metal or metal oxide similar to the embodiment 1 and the zirconia powder may be used therefor.

Also in the above-mentioned manufacturing method, the water forming the solvent of slurry is sucked in the mold 4 so that the electrolyte green body 5 and the air-electrode green body 7 are formed under the stable condition so as not to produce the crack and peeling-off. In addition, the solid-electrolyte film 50 and the air-electrode 70 can be prepared easily because they are formed by the simple procedure such as pouring of the slurry and sintering of the molded body. Namely, the above-mentioned manufacturing method can be carried out easily.

The zirconia having a small grain size is used for the slurry forming the electrolyte green body 5 so that the solid-electrolyte film 50 becomes dense, and the zirconia having a large grain size is used for the slurry forming the air-electrode green body 7 so that the air-electrode 70 becomes porous. The tetragonal zirconia or the partial stabilized zirconia is specially used for the slurry forming the air-electrode green body 7 so that the air-electrode green body 7 increases its strength when it is sintered to be formed into the air-electrode 70, and the air-electrode 70 functions also as the support material. Further, thicknesses of the electrolyte green body 5 and the air-electrode green body 7 can be controlled at will by changing a time of pouring the slurry and an amount of slurry components. Functions other than aboves are similar to those of the embodiment 1, and operations of the prepared solid-electrolyte fuel cell 20a are also similar to those of the embodiment 1.

As described above, in the manufacturing method of this embodiment, the electrolyte green body 5 and the air-electrode green body 7 can be formed under the stable condition, and the crack and peeling-off can be prevented. In addition, the solid-electrolyte film 50 and the air-electrode 70 can be formed by such a simple procedure that the slurry is poured into the concave portion 4a of the mold 4 to form the electrolyte green body 5 and the air-electrode green body 7 which are then sintered, so that the manufacturing method can be carried out easily. Moreover, the mold 4 and a device for sintering are required at most so that the above-mentioned manufacturing method is inexpensive when it is put in use.

Embodiment 3

In the manufacturing method of this embodiment, only the following point is different from that of the embodiment 1. Namely, in the embodiment 1, the electrolyte green body and the electrode (fuel-electrode and air-electrode) green body are formed in this order by using the mold 4. However, in the present embodiment, the electrode green body and the electrolyte green body are formed in this order as shown by FIG. 12 through FIG. 15.

Figure 12:
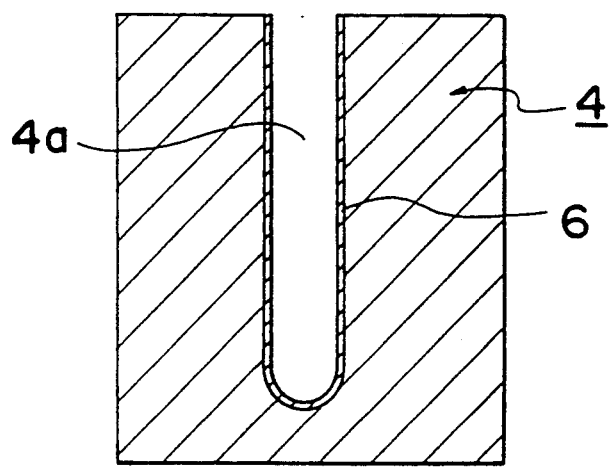
FIG. 12 through FIG. 15 are sectional views for each process of embodiment 3.

In the first place, a slurry similar to the slurry for forming the fuel-electrode green body 6 of the embodiment 1 is prepared. The prepared slurry is poured into the concave portion 4a of the mold 4 and left as it is for a specified time so as to form the fuel-electrode green body 6 as shown by FIG. 12, and an excessive slurry is then removed therefrom if existing. The fuel-electrode green body 6 is formed as a layer along an inside surface of the concave portion 4a.

Figure 13:
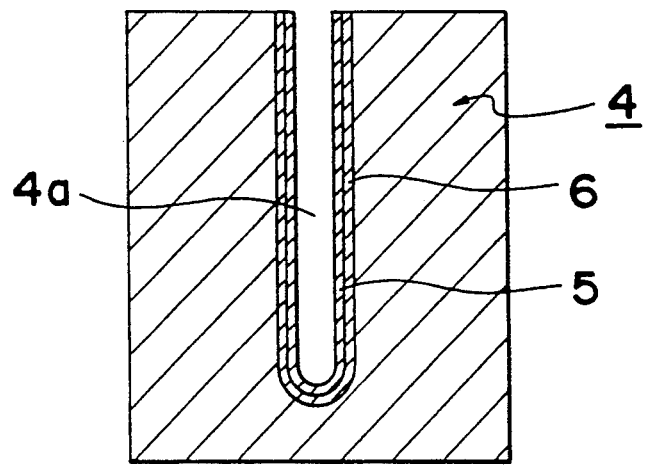

In the next place, a slurry similar to the slurry for forming the electrolyte green body 5 of the embodiment 1 is prepared. The slurry thus prepared is poured onto the fuel-electrode green body 6 before the fuel-electrode green body 6 has been dried up and left as it is for a specified time so as to form the electrolyte green body 5 as shown by FIG. 13, and an excessive slurry is then removed therefrom if existing. The electrolyte green body 5 is formed as a film along a surface of the fuel-electrode green body 6.

Figure 14:
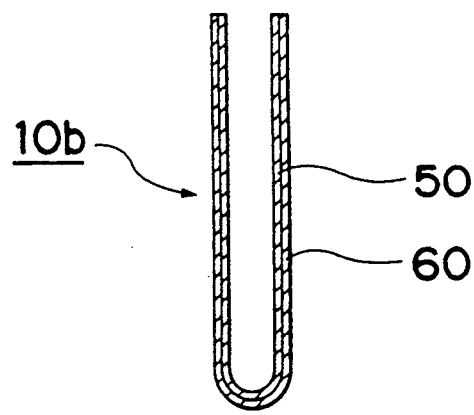

In the third place, the fuel-electrode green body 6 and the electrolyte green body 5 are dried to form a double-layer green body made up by integrating the both, the mold 4 is then removed therefrom, and the double-layer green body is sintered to form an electrolyte-electrode composite 10b as shown by FIG. 14. In FIG. 14, an outside is the fuel-electrode 60, and an inside is the solid-electrolyte film 50.

Figure 15:
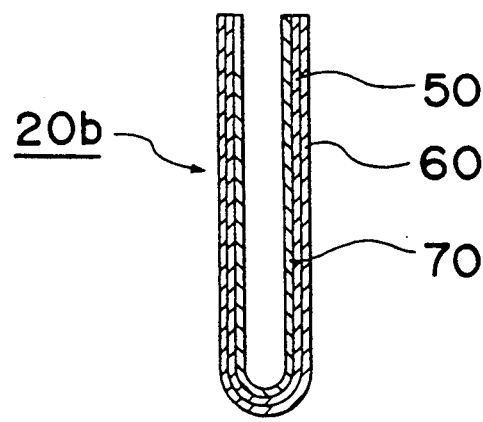

In the fourth place, the air-electrode 70 is formed on an inside of the solid-electrolyte film 50 of the electrolyte-electrode composite 10b as shown by FIG. 15. The air-electrode 70 is formed by using the same material and method as those for forming the air-electrode 70 of the embodiment A solid-electrolyte fuel cell 20b having a three-layer structure can thus be obtained, which is equipped with the fuel-electrode 60 at its outside, the air-electrode 70 at its inside and the solid-electrolyte electrolyte film 50 sandwiched between them.

As described above, in the present manufacturing method, the fuel-electrode green body 6 and the electrolyte green body 5 are formed in this order by using the mold 4, and the mold 4 is then removed therefrom to form the air-electrode 70.

The above-mentioned manufacturing method also has the same function as the embodiment 1. Namely, the crack and peeling-off can be prevented. Further, this method is easy and inexpensive when it is put in use. The fuel-electrode 60 becomes porous and the solid-electrolyte film 50 becomes dense. The fuel-electrode 60 also has a function as a support material. Moreover, a resistance and mechanical strength of the solid-electrolyte film 50 can be controlled. Furthermore, thicknesses of the fuel-electrode green body 6 and the electrolyte green body 5 are also controlled at will. While, the nickel oxide added in the slurry for forming the fuel-electrode green body 6 produces a function as the fuel-electrode 60.

The prepared solid-electrolyte fuel cell 20b also functions in the same manner as the fuel cell 20 of the embodiment 1.

Figure 16:
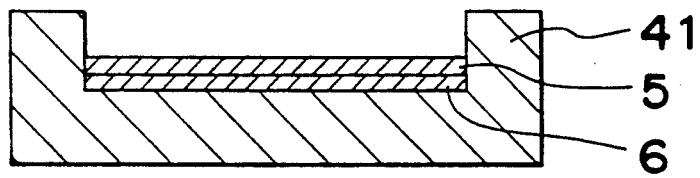
FIG. 16 and FIG. 17 are sectional views for one process showing another example of the embodiment 3, respectively.
Figure 17:
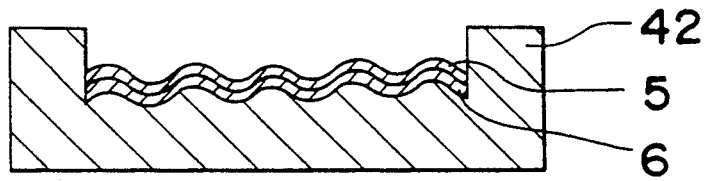

In the above embodiment, the mold 4 is used to form the tubular battery. However, a planar type battery can be obtained when a mold 41 as shown by FIG. 16 is used, and a monolithic type battery can be obtained when a mold 42 as shown by FIG. 17 is used.

In the present manufacturing method as described above, the fuel-electrode green body 6 and the electrolyte green body 5 can be formed under the stable condition, and the crack and peeling-off can be prevented. Further, the fuel-electrode 60 and the solid-electrolyte film 50 can be formed by the simple process so that this method can be carried out easily. Moreover, the mold 4 and a device for sintering are required at most so that this method is inexpensive when it is put in use.

Embodiment 4

In the manufacturing method of this embodiment, only the order of forming the electrode is different from that of the embodiment 3, and others are similar to those of the embodiment 3. Namely, in the present embodiment, the air-electrode green body 7 and the electrolyte green body 5 are formed in this order by using the mold 4, and the mold 4 is then removed therefrom to form the fuel-electrode 60 as shown by FIG. 18 through FIG. 21.

Figure 18:
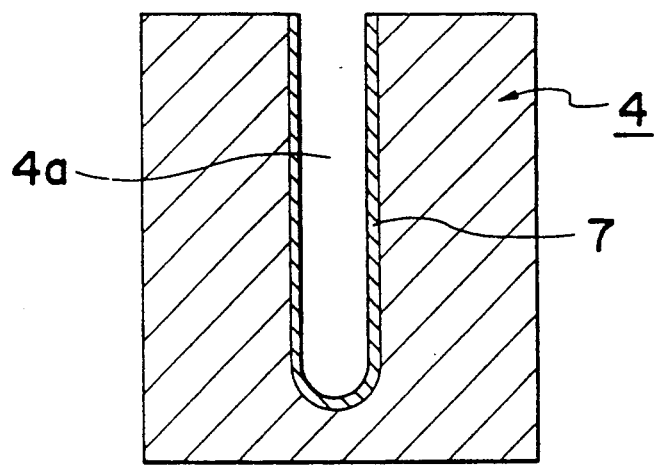
FIG. 18 through FIG. 21 are sectional views for each process of embodiment 4.

In the first place, a slurry similar to the slurry for forming the air-electrode green body 7 of the embodiment 2 is prepared. The prepared slurry is poured into the concave portion 4a of the mold 4 and left as it is for a specified time so as to form the air-electrode green body 7 as shown by FIG. 18, and an excessive slurry is then removed therefrom if existing. The air-electrode green body 7 is formed as a layer along an inside surface of the concave portion 4a.

Figure 19:
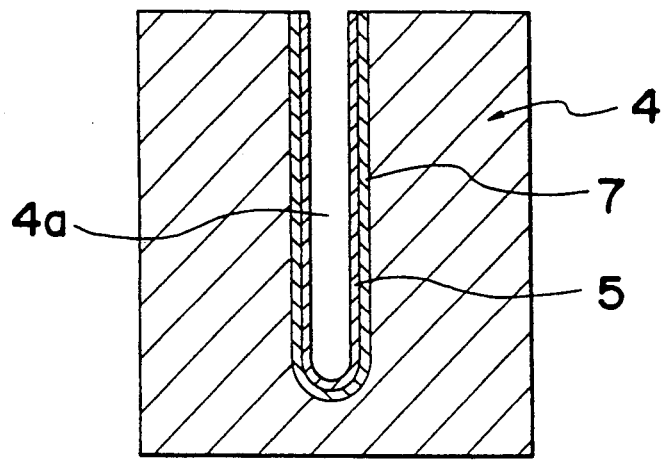

In the next place, a slurry similar to the slurry for forming the electrolyte green body 5 of the embodiment 1 is prepared. The slurry thus prepared is poured onto the air-electrode green body 7 before the air-electrode green body 7 has been dried up and left as it is for a specified time so as to form an electrolyte green body 5 as shown by FIG. 19, and an excessive slurry is then removed therefrom if existing. The electrolyte green body 5 is formed as a film along a surface of the air-electrode green body 7.

Figure 20:
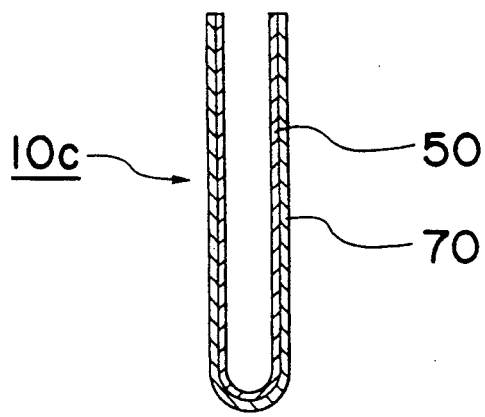

In the third place, the air-electrode green body 7 and the electrolyte green body 5 are dried to form a double-layer green body made up by integrating the both, the mold 4 is then removed therefrom, and the double-layer green body is sintered to form an electrolyte-electrode composite 10c as shown by FIG. 20. In FIG. 20, an outside is the air-electrode 70, and an inside is the solid-electrolyte film 50.

Figure 21:
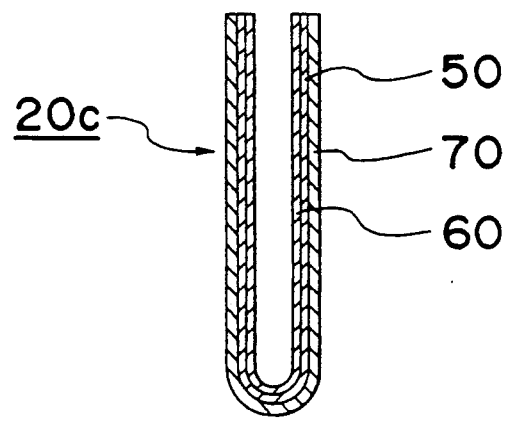

In the fourth place, the fuel-electrode 60 is formed on an inside of the solid-electrolyte film 50 of the electrolyte-electrode composite 10c as shown by FIG. 21. The fuel-electrode 60 is formed by using the same material and method as those for forming the fuel-electrode 60 of the embodiment 2. A solid-electrolyte fuel cell 20c having a three-layer structure can thus be obtained, which is equipped with the air-electrode 70 at its outside, the fuel-electrode 60 at its inside and the solid-electrolyte film 50 sandwiched between them.

The above-mentioned manufacturing method also has the same function as the embodiment 3. Namely, the crack and peeling-off can be prevented. Further, this method is easy and inexpensive when it is put in use. The air-electrode 70 also has a function as the support material. Moreover, thicknesses of the air-electrode green body 7 and the electrolyte green body 5 are also controlled at will. The prepared solid-electrolyte fuel cell 20c also functions in the same manner as the embodiment 3.

In the foregoing manufacturing method as described above, the air-electrode green body 7 and the electrolyte green body 5 can be formed under the stable condition, and the crack and peeling-off can be prevented. Further, the air-electrode 70 and the solid-electrolyte film 50 can be formed by the simple process so that this method can be carried out easily. Moreover, the mold 4 and a device for sintering are required at most so that this method is inexpensive when it is put in use.

Embodiment 5

In the manufacturing method of this embodiment, the entire of the electrolyte green body and the electrode green body are formed by using the mold 4. The present embodiment is different from those of the embodiment 1 through embodiment 4 in this point. Namely, in the present embodiment, the fuel-electrode green body 6, the electrolyte green body 5 and the air-electrode green body 7 are formed in this order by using the mold 4 similar to that of the embodiment 1 as shown by FIG. 22 through FIG. 25.

Figure 22:
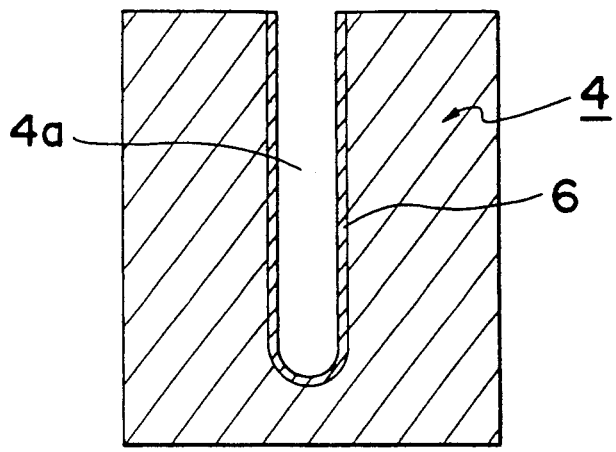
FIG. 22 through FIG. 25 are sectional views for each process of embodiment 5.

In the first place, a slurry similar to the slurry for forming the fuel-electrode green body 6 of the embodiment 1 is prepared. The prepared slurry is poured into the concave portion 4a of the mold 4 and left as it is for a specified time so as to form the fuel-electrode green body 6 as shown by FIG. 22, and an excessive slurry is then removed therefrom if existing. The fuel-electrode green body 6 is formed as a layer along an inside surface of the concave portion 4a.

Figure 23:
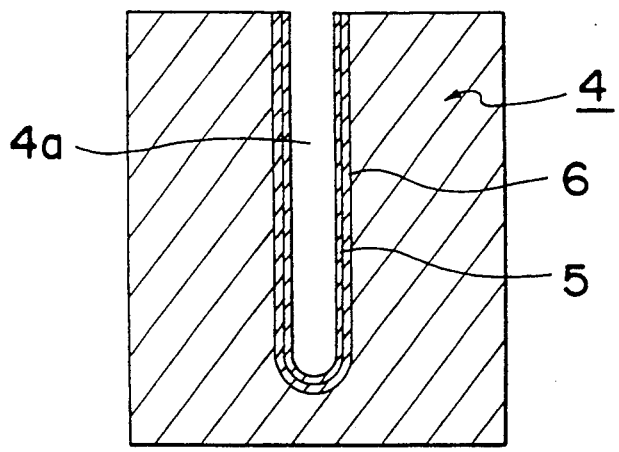

In the next place, a slurry similar to the slurry for forming the electrolyte green body 5 of the embodiment 1 is prepared. The slurry thus prepared is poured onto the fuel-electrode green body 6 before the fuel-electrode green body 6 has been dried up and left as it is for a specified time so as to form an electrolyte green body 5 as shown by FIG. 23, and an excessive slurry is then removed therefrom if existing. The electrolyte green body 5 is formed as a film along a surface of the fuel-electrode green body 6.

Figure 24:
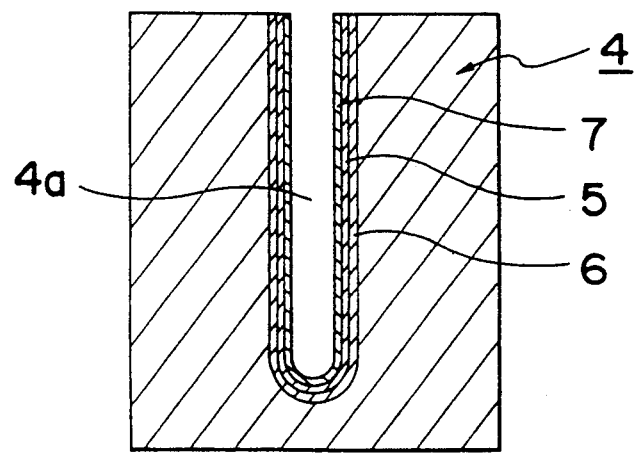

In the third place, a slurry similar to the slurry for forming the air-electrode green body 7 of the embodiment 2 is prepared. The slurry thus prepared is poured onto the electrolyte green body 5 before the electrolyte green body 5 has been dried up and left as it is for a specified time so as to form an air-electrode green body 7 as shown by FIG. 24, and an excessive slurry is then removed therefrom if existing. The air-electrode green body 7 is formed as a layer along a surface of the electrolyte green body 5.

Figure 25:
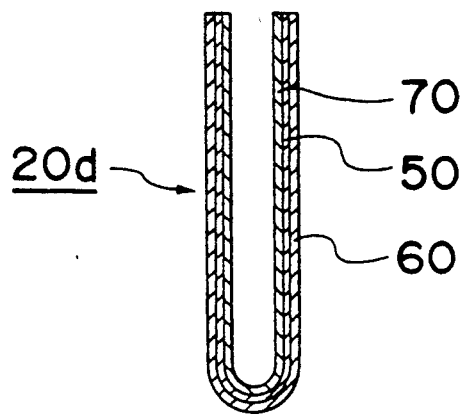

In the fourth place, the fuel-electrode green body 6, the electrolyte green body 5 and the air-electrode green body 7 are dried to form a three-layer green body made up by integrating the three, the mold 4 is then removed therefrom, and the three-layer green body is sintered to form a solid-electrolyte fuel cell 20d as shown by FIG. 25. In FIG. 25, an outside is the fuel-electrode 60 and an inside is the air-electrode 70, and the solid-electrolyte film 50 is sandwiched between them.

The above-mentioned manufacturing method also has the same function as the embodiment 1. Namely, the water forming the solvent of slurry is sucked in the mold 4 so that the fuel-electrode green body 6, the electrolyte green body 5 and the air-electrode green body 7 are formed under the stable condition so as not to produce the crack and peeling-off. In addition, the fuel-electrode 60, the solid-electrolyte film 50 and the air-electrode 70 can be prepared easily because they are formed by the simple process such as pouring and sintering of the slurry. Namely, the above-mentioned manufacturing method can be carried out easily. Moreover, the mold 4 and a device for sintering are required at most so that the above-mentioned manufacturing method is inexpensive when it is put in use. The zirconia having a large grain size is used for the slurry forming the fuel-electrode green body 6 and the air-electrode green body 7 so that the fuel-electrode 60 and the air-electrode 70 become porous, and the zirconia having a small grain size is used for the slurry forming the electrolyte green body 5 so that the solid-electrolyte film 50 becomes dense. The fuel-electrode 60 and the air-electrode 70 also have a function as the support material. Further, a resistance and mechanical strength of the solid-electrolyte film 50 can be controlled. Moreover, thicknesses of the fuel-electrode green body 6, the electrolyte green body 5 and the air-electrode green body 7 can be controlled at will by changing a time of pouring the slurry and an amount of slurry components. While, the nickel oxide added in the slurry for forming the fuel-electrode green body 6 is active to produce a function as the fuel-electrode 60.

The prepared solid-electrolyte fuel cell 20d also functions in the same manner as the fuel cell 20 of the embodiment 1.

Figure 26:
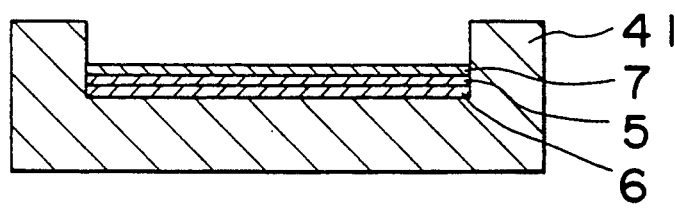
FIG. 26 and FIG. 27 are sectional views for one process showing another example of the embodiment 5, respectively.
Figure 27:
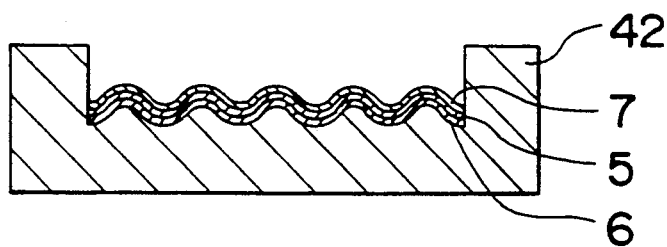
Figure 28:
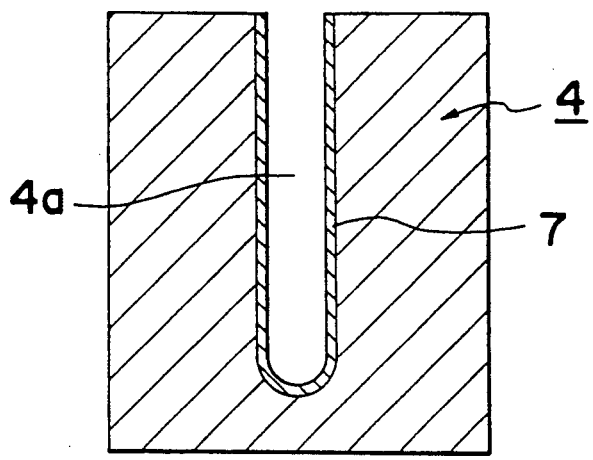
FIG. 28 through FIG. 31 are sectional views for each process of embodiment 6.
Figure 29:
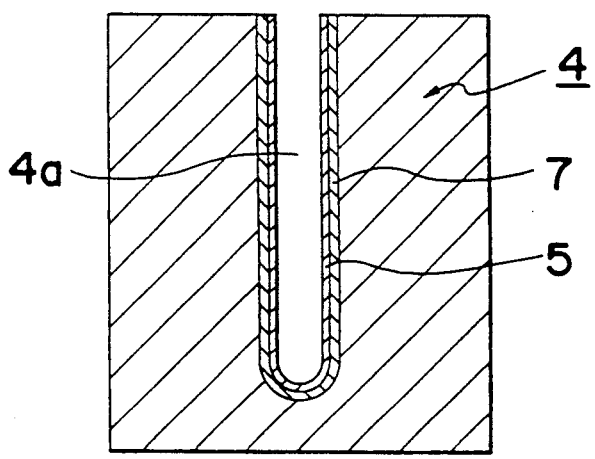
Figure 30:
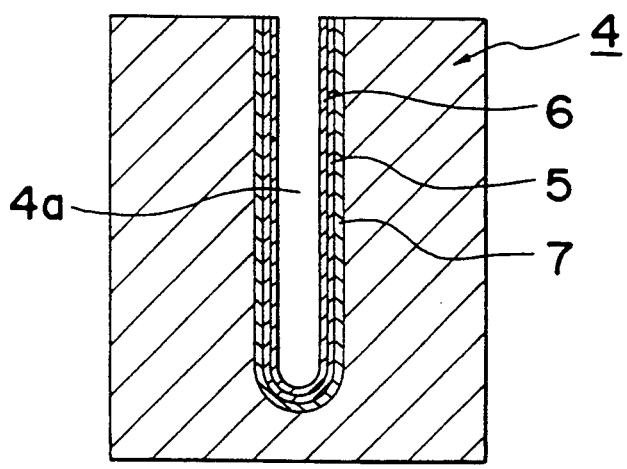

The mold 4 is one for making up the tubular battery in the above embodiment. However, a planar type battery can be obtained when a mold 41 as shown by FIG. 26 is used, and a monolithic type battery can be obtained when a mold 42 as shown by FIG. 27 is used.

As described above, in the manufacturing method of this embodiment, the fuel-electrode green body 6, the electrolyte green body 5 and the air-electrode green body 7 can be formed under the stable condition, and the crack and peeling-off can be prevented. In addition, the fuel-electrode 60, the solid-electrolyte film 50 and the air-electrode 70 can be formed simultaneously by such a simple way that the slurry is poured into the concave portion 4a of the mold 4 to form the fuel-electrode green body 6, the electrolyte green body 5 and the air-electrode green body 7 which are then sintered, so that the manufacturing method can be carried out very easily. Moreover, the mold 4 and a device for sintering are required at most so that the above-mentioned manufacturing method is inexpensive when it is put in use.

Embodiment 6

In the manufacturing method of this embodiment, only the order of forming the electrode is different from that of the embodiment 5, and others are similar to those of the embodiment 5. Namely, in the present embodiment, the air-electrode green body 7, the electrolyte green body 5 and the fuel-electrode green body 6 are formed in this order by using the mold 4 as shown by FIG. 28 through FIG. 31.

Figure 31:
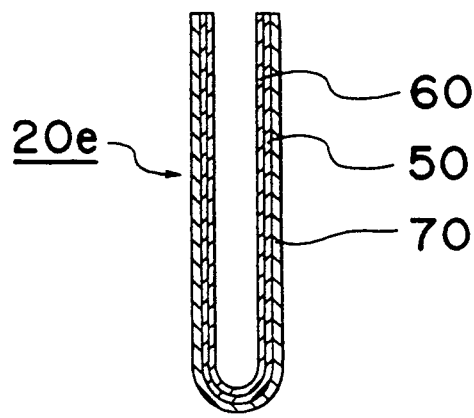

The air-electrode green body 7 (FIG. 28), the electrolyte green body 5 (FIG. 29) and the fuel-electrode green body 6 (FIG. 30) are formed in this order in the concave portion 4a of the mold 4 by using respectively a slurry similar to that used in the embodiment 5, in the same manner as the embodiment 5. They are dried to form a three-layer green body made up by integrating the three, the mold 4 is then removed therefrom, and the three-layer green body is then sintered to form a solid-electrolyte fuel cell 20e as shown by FIG. 31. In FIG. 31, an outside is the air-electrode 70 and an inside is the fuel-electrode 60, and the solid-electrolyte film 50 is sandwiched between them.

The above-mentioned manufacturing method also has the same function and effect as those of the embodiment 5. Namely, the water forming the solvent of slurry is sucked in the mold 4 so that the air-electrode green body 7, the electrolyte green body 5 and the fuel-electrode green body 6 are formed under the stable condition so as not to produce the crack and peeling-off. In addition, the manufacturing method can also be carried out easily and inexpensively. Further, other functions are the same as those of the embodiment 5. The prepared solid-electrolyte fuel cell 20e also functions in the same manner as the fuel cell 20 of the embodiment 1. Moreover, in this method, the crack and peeling-off can be prevented. This method can be carried out very easily and inexpensively.

Embodiment 7

In order to make up a solid-electrolyte fuel cell module, it is necessary to fabricate a structure in which an inside electrode can be exposed by equipping with an interconnector. Further, such an interconnector is required to be dense, so that it has been formed by a plasma spray method and an electrochemical vapor deposition method. Therefore, it has been expensive and it has been problems in its mass-production. $LaCrO_3$ and $CoCr_2O_4$ for making up the interconnector is hard to be sintered, so that it has been required to sinter them at a comparatively high temperature (about over 1,500° C. incl.). In order to lower this sintering temperature, a procedure to add an excessive strontium oxide or calcium oxide is generally applied now. However, this procedure includes such a problem that these oxides diffuse in the electrode during operating the cell to worsen a battery performance.

The manufacturing method of this embodiment is one which can dissolve the above problems encountered in manufacturing the solid-electrolyte fuel cell equipped with the interconnector. Namely, this manufacturing method is inexpensive and easy, and can prevent the deterioration of the battery performance.

In the manufacturing method of this embodiment, only a work and a process for making up the interconnector are added to the manufacturing method of the embodiment 1, and others are similar to those of the embodiment 1.

Figure 32:
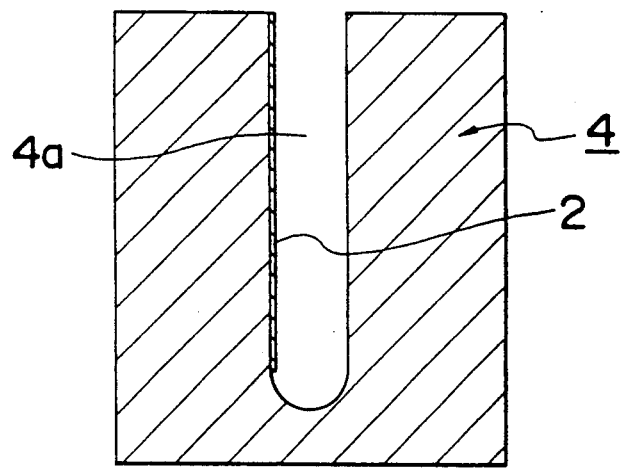
FIG. 32 through FIG. 36 are sectional views for each process of embodiment 7.
Figure 33:
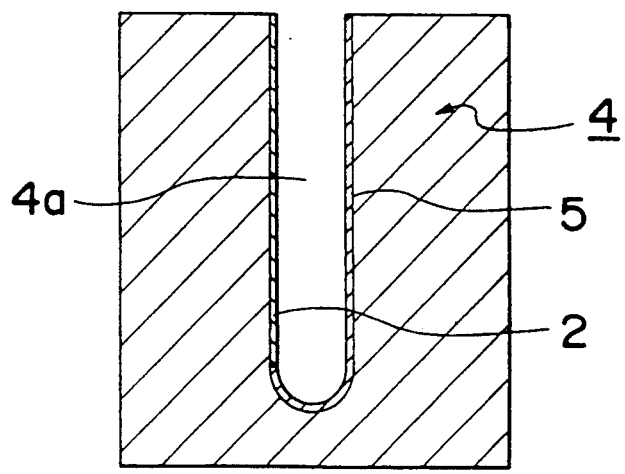

In the first place, a cellophane tape 2 forming a water resistant and water repellent member is stuck to a part (left side part of FIG. 32) of an inside surface of the concave portion 4a of the mold 4. A slurry similar to the slurry for forming the electrolyte green body 5 of the embodiment 1 is poured in the concave portion 4a so as to form the electrolyte green body 5 in the same manner as the embodiment 1. The electrolyte green body 5 is formed as a film along the inside surface of the concave portion 4a other than a part to which the cellophane tape 2 is stuck as shown by FIG. 33.

Figure 34:
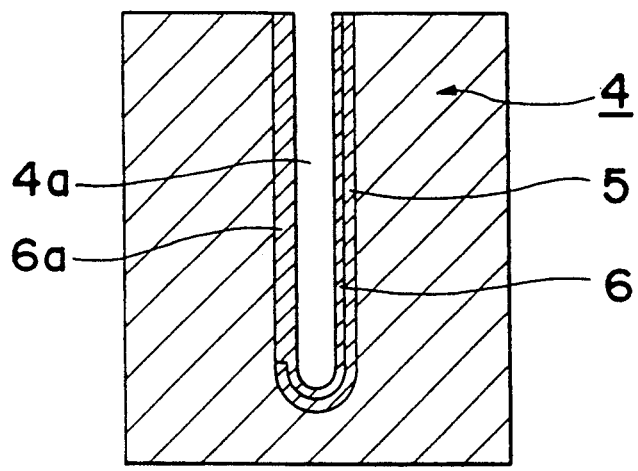

In the next place, the cellophane tape 2 is removed, and a slurry similar to the slurry for forming the fuel-electrode green body 6 of the embodiment 1 is then poured therein so as to form the fuel-electrode green body 6 in the same manner as the embodiment 1 as shown by FIG. 34. The fuel-electrode green body 6 is formed as a layer on the electrolyte green body 5 and along the part, to which the cellophane tape 2 was stuck, of the inside surface of the concave portion 4a. Namely, the fuel-electrode green body 6 is put under a state where it is exposed from the electrolyte green body 5 at the part to which the cellophane tape 2 was stuck. In FIG. 34, 6a denotes an exposed part.

Figure 35:
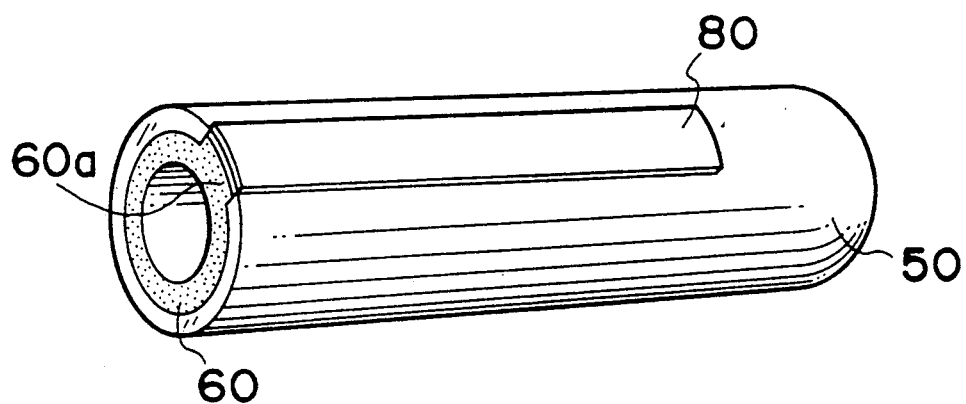

In the third place, the article under the state of FIG. 34 is dried and the mold 4 is then removed therefrom, so that an interconnector 80 is formed as shown by FIG. 35.

The interconnector 80 is formed in the following manner. Namely, a slurry including $LaCrO_3$ is applied or sprayed on a surface of the exposed part 6a of the article from which the mold 4 is removed. Thereafter, it is first sintered under an oxidizing atmosphere of about 1,000° C., and then sintered under a reducing atmosphere of about 1,300° C. to 1,500° C.. The sintering under an oxidizing atmosphere of about 1,000° C. is carried out in order to burn out organic substances such as the dispersant and binder etc. included in the electrolyte green body 5 and the fuel-electrode green body 6. In FIG. 35, an outside is the solid-electrolyte film 50 and an inside is the fuel-electrode 60. 60a denotes a part which has been the exposed part 6a, and the interconnector 80 is formed on a surface of the part 60a. $CoCr_2O_4$ may be used in place of $LaCrO_3$.

Figure 36:
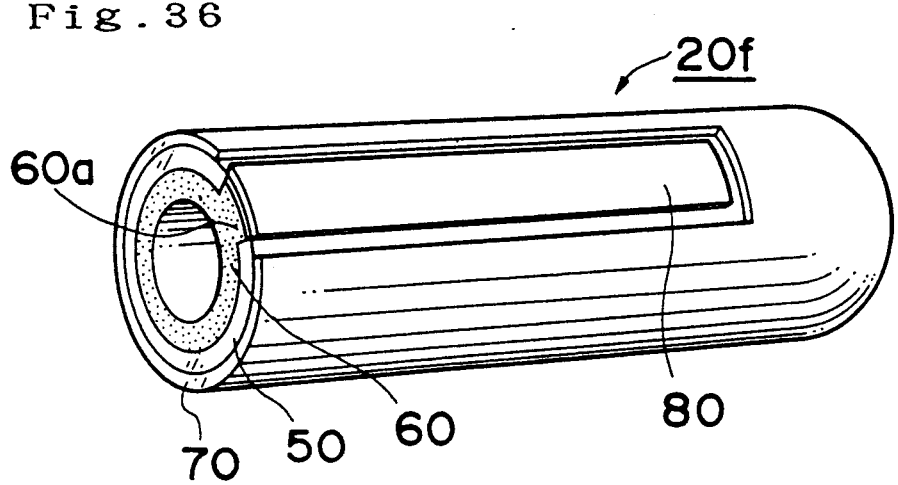

In the fourth place, as shown by FIG. 36, the air-electrode 70 is formed on an outside of the solid-electrolyte film 50 of the article shown in FIG. 35, while avoiding the interconnector 80. The air-electrode 70 is formed by using the same material and method as those for forming the air-electrode 70 of the embodiment 1. A solid-electrolyte fuel cell 20f can thus be obtained, which has a three-layer structure equipped with the air-electrode 70 at its outside, the fuel-electrode 60 at its inside and the solid-electrolyte film 50 sandwiched between them, and additionally has the interconnector 80.

As described above, in the present embodiment, the inside fuel-electrode 60 is so devised that it can be exposed by the work using the cellophane tape 2.

According to the forming method of the interconnector 80 as described above, the interconnector 80 is finally sintered under the reducing atmosphere, so that it is not necessary to previously add the strontium oxide or calcium oxide excessively. This means that the interconnector 80 can be formed without using the strontium oxide or calcium oxide excessively. Therefore, the obtained fuel cell 20f is not deteriorated in its performance due to the dispersion of strontium oxide or calcium oxide.

Also in the above-mentioned manufacturing method, the water forming the solvent of slurry is sucked in the mold 4 so that the electrolyte green body 5 and the fuel-electrode green body 6 are formed under the stable condition so as not to produce the crack and peeling-off. In addition, the solid-electrolyte film 50, the fuel-electrode 60 and the interconnector 80 can be prepared easily by the simple process such as pouring and sintering of the slurry, so that they can be obtained easily. Namely, the above-mentioned manufacturing method can be carried out easily. Moreover, the mold 4 and a device for sintering are required at most so that the above-mentioned manufacturing method is inexpensive when it is put in use.

Other functions are the same as those of the embodiment 1. The prepared solid-electrolyte fuel cell 20f also functions in the same manner as the fuel cell 20 of the embodiment 1.

Since the solid-electrolyte fuel cell 20f is equipped with the interconnector 80, the solid-electrolyte fuel cell module can be made up easily.

The interconnector 80 is not necessarily formed by the above-mentioned method, but it may be formed by the following methods (1) and (2). Namely, the article under the state of FIG. 34 is dried and the mold 4 is then removed therefrom. (1) Thereafter, it is sintered under the oxidizing atmosphere of about 1,300° C. to 1,500° C., and a material including LaCrO$_3$ is then sprayed on a surface of the exposed part 6a by means of the plasma spray method etc. so as to form the interconnector 80. (2) It is sintered under the oxidizing atmosphere of about 1,300° C. to 1,500° C., a slurry including LaCrO$_3$ is applied or sprayed onto the surface of the exposed part 6a, and it is then sintered under a reducing atmosphere of about 1,300° C. to 1,500° C. According to the above method (1), it is not necessary to change the atmosphere from oxidizing one to reducing one during sintering so that the work becomes simple.

As described above, in the present manufacturing method, the solid-electrolyte fuel cell 20f equipped with the interconnector 80 can be obtained inexpensively and easily without accompanying the deterioration of battery performance. Further, the electrolyte green body 5 and the fuel-electrode green body 6 can be formed under the stable condition so that the crack and peeling-off can be prevented.

Embodiment 8

The manufacturing method of this embodiment is one for manufacturing a solid-electrolyte fuel cell equipped with an interconnector, and different from the embodiment 7 only in the following point. Namely, in the embodiment 7, the fuel-electrode 60 is formed at the inside and the air-electrode 70 is formed at the outside, and the fuel-electrode 60 is pulled outside so as to form the interconnector. However, in the present embodiment, the air-electrode 70 is formed at the inside and the fuel-electrode 60 is formed at the outside, and the air-electrode 70 is exposed so as to form the interconnector. Other points including a work and process for forming the interconnector are the same as those of the embodiment 7, except for a point that the condition of reducing atmosphere for the sintered is mile int he forming process of interconnector.

In the first place, a slurry is poured in the concave portion 4a of the mold 4 (FIG. 32) to which the cellophane tape 2 is stuck, so as to form the film-like electrolyte green body 5 (FIG. 33) along the inside surface of the concave portion 4a other than the part to which the cellophane tape 2 is stuck.

Figure 37:
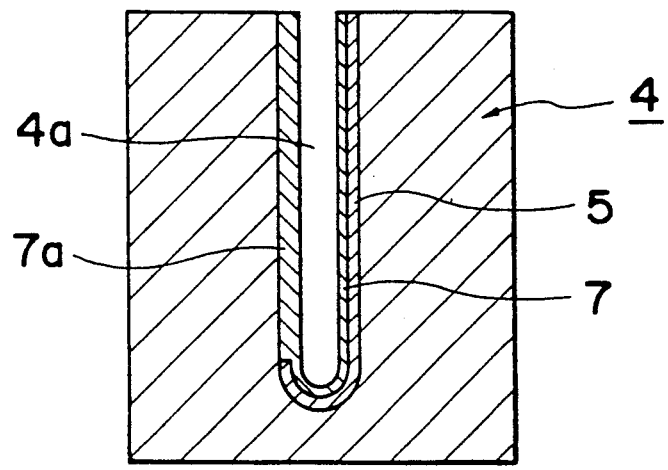
FIG. 37 through FIG. 39 are sectional views for each process of embodiment 8.

In the next place, the cellophane tape 2 is removed, and a slurry similar to the slurry for forming the air-electrode green body 7 of the embodiment 2 is then poured therein so as to form the air-electrode green body 7 in the same manner as forming the fuel-electrode green body 6 of the embodiment 7, as shown by FIG. 37. The air-electrode green body 7 is formed as a layer on the electrolyte green body 5 and along the part, to which the cellophane tape 2 was stuck, of the inside surface of the concave portion 4a. Namely, the air-electrode green body 7 is put under a state where it is exposed from the electrolyte green body 5 at the part to which the cellophane tape 2 was stuck. In FIG. 37, 7a denotes an exposed part.

Figure 38:
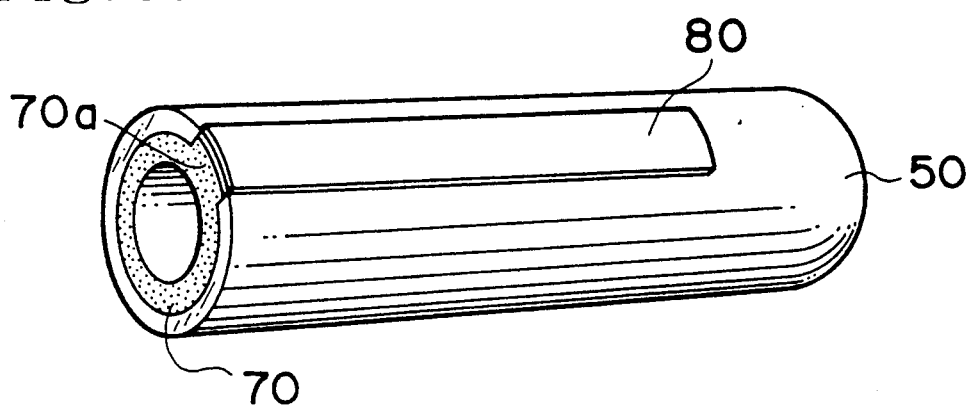

In the third place, the article under the state of FIG. 37 is dried and the mold 4 is then removed therefrom, so that an interconnector 80 is formed as shown by FIG. 38.

A method and material used for forming the interconnector 80 are similar to those of the embodiment 7. However, a condition of reducing atmosphere when sintering is milder than that of the embodiment 7. In FIG. 38, an outside is the solid-electrolyte film 50 and an inside is the air-electrode 70. 70a is a part which was the exposed part 7a, and the interconnector 80 is formed on a surface of the part 70a.

Figure 39:
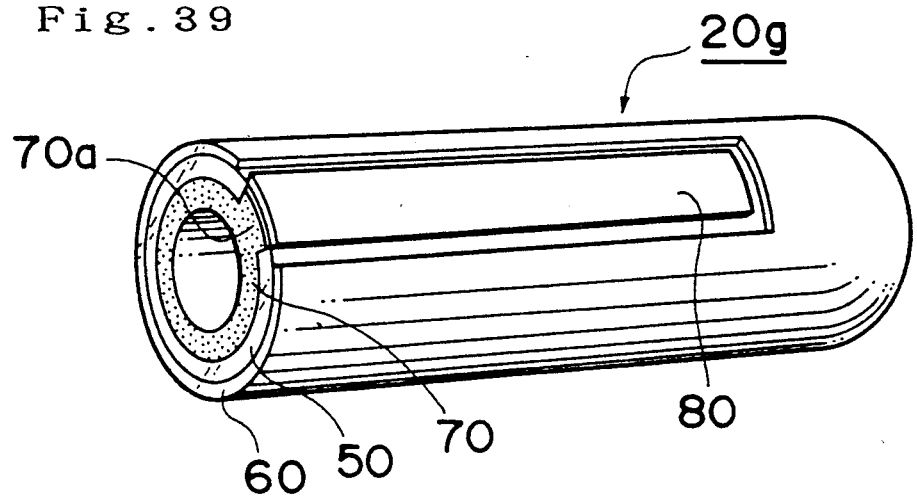

In the fourth place, as shown by FIG. 39, the fuel-electrode 60 is formed on an outside of the solid-electrolyte film 50 of the article shown in FIG. 38, while avoiding the interconnector 80. The fuel-electrode 60 is formed by using the same material and method as those for forming the fuel-electrode 60 of the embodiment 2. A solid-electrolyte fuel cell 20g can thus be obtained, which has a three-layer structure equipped with the fuel-electrode 60 at its outside, the air-electrode 70 at its inside and the solid-electrolyte film 50 sandwiched between them, and additionally has the interconnector 80.

As described above, in the present embodiment, the inside air-electrode 70 is so devised that it can be exposed by the work using the cellophane tape 2.

A function of the forming method of the interconnector 80 described above is the same as that of the embodiment 7. Namely, the fuel cell 20g does not incur the deterioration of battery performance because the interconnector 80 can be formed without using the strontium oxide or calcium oxide excessively.

The above-mentioned manufacturing method also has the same function as the embodiment 7. That is, the crack and peeling-off are not produced. In addition, this manufacturing method can be carried out easily and inexpensively. Further, the obtained solid-electrolyte fuel cell 20g operates in the same manner as the fuel cell 20a of the embodiment 2.

Since the solid-electrolyte fuel cell 20g is equipped with the interconnector 80, the solid-electrolyte fuel cell module can be made up easily.

It goes without saying that the methods (1) and (2) of the embodiment 7 may be used for the forming method of the interconnector 80. However, in case when the method (2) is used, the condition of reducing atmosphere should be made milder than that of the embodiment 7.

As described above, in the present manufacturing method, the solid-electrolyte fuel cell 20g equipped with the interconnector 80 can be obtained inexpensively and easily without accompanying the deterioration of battery performance Further, the electrolyte green body 5 and the air-electrode green body 7 can be formed under the stable condition so that the crack and peeling-off can be prevented.

Embodiment 9

Figure 40:
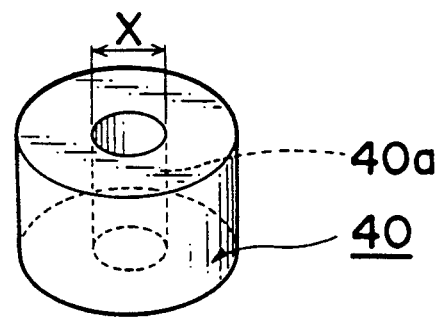
FIG. 40 is a perspective view showing an open mold for use in embodiment 9 and embodiment 10.
Figure 41:
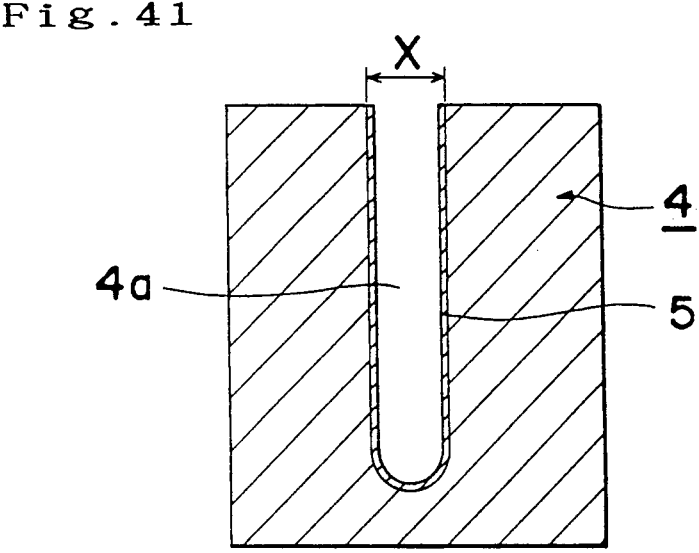
FIG. 41 through FIG. 44 are sectional views for each process of the embodiment 9.

The manufacturing method of this embodiment is one for manufacturing a solid-electrolyte fuel cell having an exposed part of an inside electrode A process for forming the exposed part using an open mold 40 shown in FIG. 40 is added to the manufacturing method of the embodiment 1, and other processes are the same as those of the embodiment 1.

The open mold 40 is made of a plaster forming the material having a water absorptivity similar to the mold 4, formed into a cylindrical shape and has a through hole 40a. The through hole 40a has a shape similar to an opening of the concave portion 4a of the mold 4. That is, its lateral section is circular ad has a diameter X same as that of the opening of concave portion 4a. The diameter of the through hole 40a may be larger than the diameter of the opening of concave portion 4a.

Figure 42:
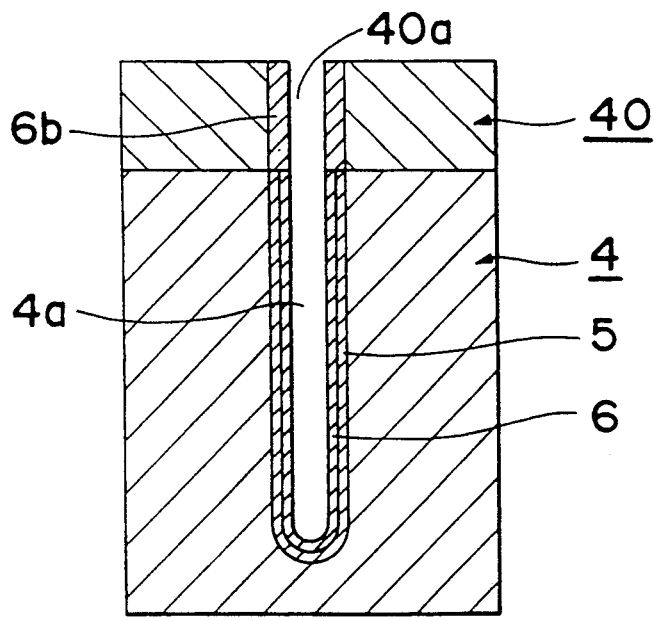

In the first place, the electrolyte green body 5 is formed in the concave portion 4a of the mold 4 in the same manner as the embodiment 1. The open mold 40 is placed on the mold 4 in such a way that the through hole 40a is set in line with the concave portion 4a as shown by FIG. 42. A slurry similar to the slurry for forming the fuel-electrode green body 6 of the embodiment 1 is poured not only onto the electrolyte green body 5 but into the through hole 40a, so as to form the fuel-electrode green body 6. In FIG. 42, 6b denotes a part which is formed on an inside surface of the through hole 40a of the fuel-electrode green body 6, and which will become the exposed part.

Figure 43:
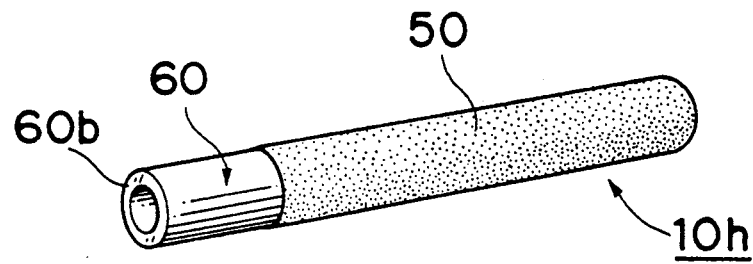

In the next place, the article under the state of FIG. 42 is dried, and the open mold 40 and the mold 4 are then removed therefrom, and the dried article is sintered, so that an electrolyte-electrode composite 10h shown by FIG. 43 is prepared. In FIG. 43, an outside is the solid-electrolyte film 50 and an inside is the fuel-electrode 60. 60b denotes an exposed part of the fuel-electrode 60.

Figure 44:
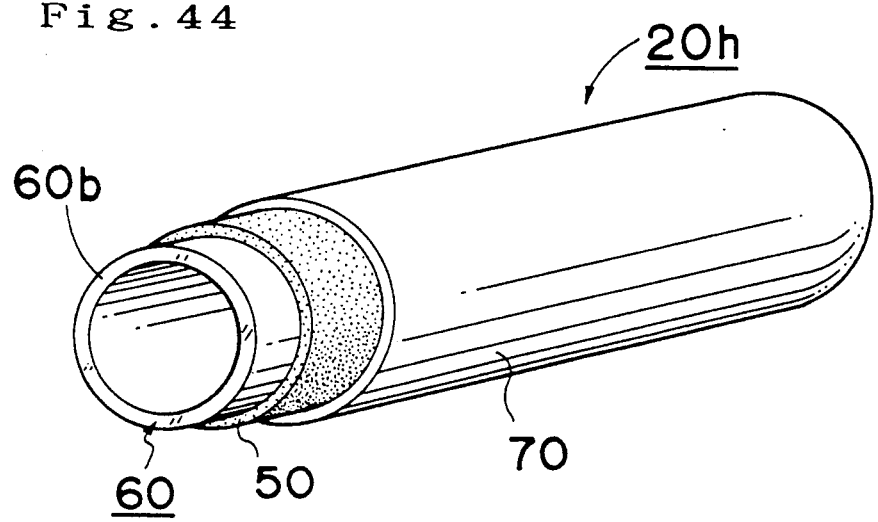

In the third place, the air-electrode 70 is formed only on an outside of the solid-electrolyte film 50 as shown by FIG. 44. Forming method and material of the air-electrode 70 are the same as those for forming the air-electrode 70 of the embodiment 1. A solid-electrolyte fuel cell 20h can thus be obtained, which has a three-layer structure equipped with the fuel-electrode 60 at its inside, the air-electrode 70 at its outside and the solid-electrolyte film 50 sandwiched between them, and additionally has the exposed part 60b of the fuel-electrode 60.

As described above, this manufacturing method is one for forming the exposed part 60b of the inside fuel-electrode 60 by the work using the open mold 40.

Also in the above-mentioned manufacturing method, the water forming the solvent of slurry is sucked in the mold 4 and the open mold 40 so that the electrolyte green body 5 and the fuel-electrode green body 6 are formed under the stable condition so as not to produce the crack and peeling-off. In addition, the solid-electrolyte film 50, the fuel-electrode 60 and the exposed part 60b can be prepared easily by the simple process such as pouring and sintering of the slurry, so that they can be obtained easily. Namely, the above-mentioned manufacturing method can be carried out easily. Moreover, the mold 4 and the open mold 40 and a device for sintering are required at most so that the above-mentioned manufacturing method is inexpensive when it is put in use.

Other functions are also the same as those of the embodiment 1. The prepared solid-electrolyte fuel cell 20h also operates in the same manner as the fuel cell 20 of the embodiment 1.

Since the solid-electrolyte fuel cell 20h is equipped with the exposed part 60b, the solid-electrolyte fuel cell module can be made up easily.

As described above, in the present manufacturing method, the solid-electrolyte fuel cell 20h equipped with the exposed part 60b of the inside fuel-electrode 60 can be obtained inexpensively and easily. Further, the electrolyte green body 5 and the fuel-electrode green body 6 can be formed under the stable condition so that the crack and peeling-off can be prevented.

Embodiment 10

The manufacturing method of this embodiment is one for manufacturing a solid-electrolyte fuel cell equipped with an exposed part of electrode, and different from the embodiment 9 only in the following point Namely, in the embodiment 9, the fuel-electrode 60 is formed at the inside and the air-electrode 70 is formed at the outside, so as to form the exposed part 60b of the fuel-electrode 60. However, in the present embodiment, the air-electrode 70 is formed at the inside and the fuel-electrode 60 is formed at the outside, and an exposed part 70b of the air-electrode 70 is formed. Other points including the forming process of the exposed part using the open mold 40 are the same as those of the embodiment 9.

Figure 45:
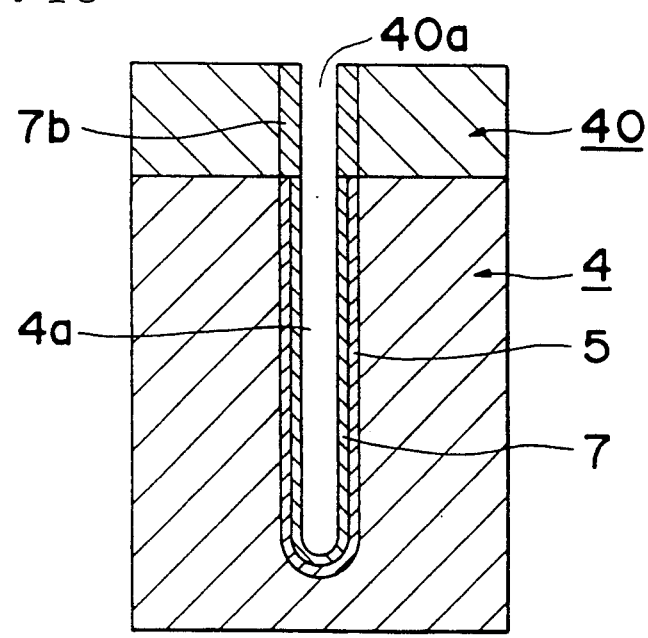
FIG. 45 through FIG. 47 are sectional views for each process of the embodiment 10.

In the first place, the electrolyte green body 5 is formed in the concave portion 4a of the mold 4 in the same manner as the embodiment 9 (FIG. 4i). The open mold 40 is placed on the mold 4 in the same way as the embodiment 9. A slurry similar to the slurry for forming the air-electrode green body 7 of the embodiment 2 is poured therein in the same way as forming the fuel-electrode 6 of the embodiment 9, so as to form the air-electrode green body 7. In FIG. 45, 7b denotes a part which is formed on an inside surface of the through hole 40a of the air-electrode green body 7, and which will become the exposed part.

Figure 46:
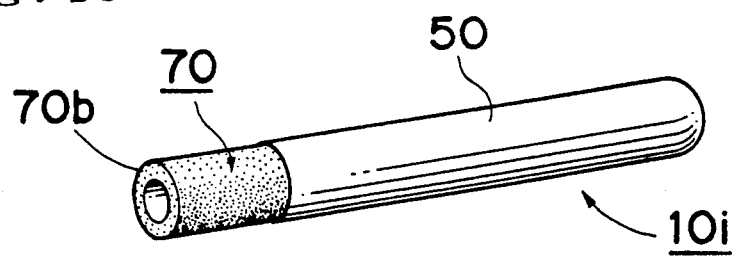

In the next place, the article under the state of FIG. 45 is dried, and the open mold 40 and the mold 4 are then removed therefrom, and sintered, so that an electrolyte-electrode composite 10i shown by FIG. 46 is prepared. In FIG. 46, an outside is the solid-electrolyte film 50 and an inside is the air-electrode 70. 70b denotes an exposed part of the air-electrode 70.

Figure 47:
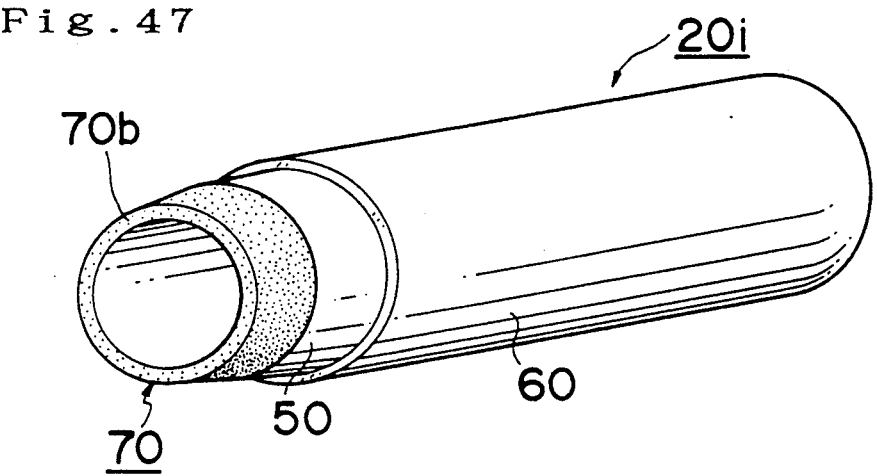
Figure 48:
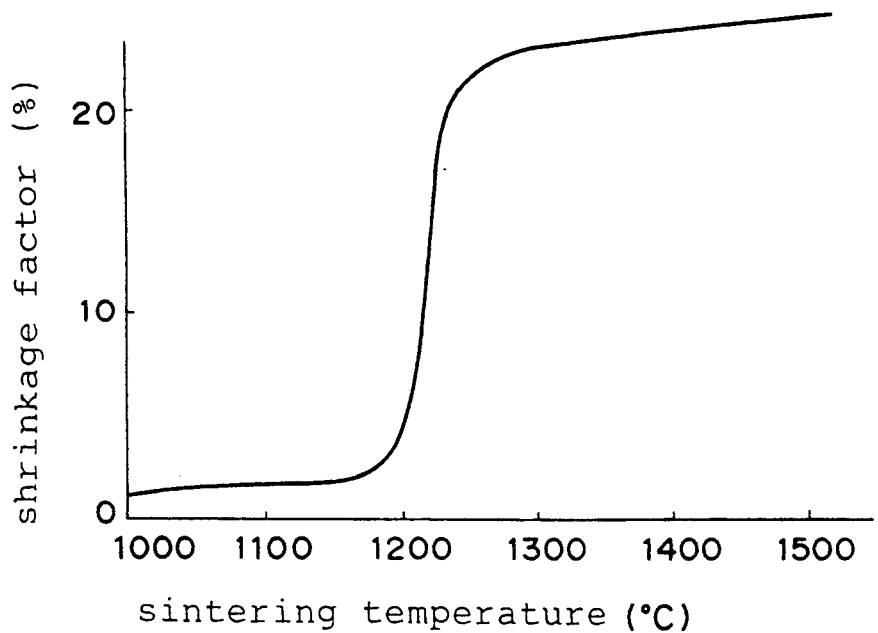
FIG. 48 is a diagram showing a relation between sintering temperatures and shrinkage factors of a conventional electrolyte green body, an electrode green body and a double-layer green body comprising the aboves in embodiment 12.

In the third place, the fuel-electrode 60 is formed only on an outside of the solid-electrolyte film 50 as shown by FIG. 47. Forming method and material of the fuel-electrode 60 are the same as those for forming the fuel-electrode 60 of the embodiment 2. A solid-electrolyte fuel cell 20i can thus be obtained, which has a three-layer structure equipped with the air-electrode 70 at its inside, the fuel-electrode 60 at its outside and the solid-electrolyte film 50 sandwiched between them, and additionally has the exposed part 70b of the air-electrode 70.

As described above, this manufacturing method is one for forming the exposed part 70b of the inside air-electrode 70 by the work using the open mold 40.

The above-mentioned manufacturing method also has the same function as that of the embodiment 9. Namely, the crack and peeling-off are not produced. In addition, this method can be carried out easily and inexpensively.

Other functions are the same as those of the embodiment 9. The prepared solid-electrolyte fuel cell 20i also functions in the same manner as the fuel cell 20a of the embodiment 2.

Since the solid-electrolyte fuel cell 20i is equipped with the exposed part 70b, the solid-electrolyte fuel cell module can be made up easily.

As described above, in the present manufacturing method, the solid-electrolyte fuel cell 20i equipped with the exposed part 70b of the inside air-electrode 70 can be obtained easily and inexpensively. Further, the electrolyte green body 5 and the air-electrode green body 7 can be formed under the stable condition so that the crack and peeling-off can be prevented.

Embodiment 11

The manufacturing method of this embodiment is one in which a carbon powder or an organic powder is mixed to a slurry for forming an electrode, so as to control a shrinkage factor of green body forming the electrode and a porosity of the electrode. This method is applicable to any one of the above-mentioned embodiments and has similar function and effect in any one of them. A case where this method is applied to the embodiment 1 will be described hereunder with reference to FIG. 1 through FIG. 6.

In the first place, the electrolyte green body 5 is formed in the concave portion 4a of the mold 4 (FIG. 1 and FIG. 2) in the same way as the embodiment 1 (FIG. 3). The fuel-electrode green body 6 is then formed on the electrolyte green body 5 in the same way as the embodiment 1 (FIG. 4), and the carbon powder is to be previously mixed to the slurry used therefor in this instance In other words, the slurry for forming the fuel-electrode green body 6 is composed of the nickel oxide powder forming the metal oxide (fuel-electrode powder), the carbon powder, the zirconia powder added with yttrium oxide forming the stabilizer, the water, the dispersant, the binder and the antifoamer. The electrolyte-electrode composite 10 is then formed in the same way as the embodiment 1 (FIG. 5), and the air-electrode 70 is formed thereafter so as to make up the solid-electrolyte fuel cell 20 (FIG. 6).

In the sintering at the time of forming the electrolyte-electrode composite 10, the carbon powder is oxidized to become carbon monoxide or carbon dioxide and is released to outside. Consequently, a shrinkage factor of the fuel-electrode green body 6 will become large when a quantity of the carbon powder is large, and the former will become small when the latter is small. Further, a porosity of the fuel-electrode 60 will become large when a grain size of the carbon powder is large, and the former will become small when the grain size of the carbon powder is small.

As described above, in the present manufacturing method, the shrinkage factor of the fuel-electrode green body 6 and the porosity of the fuel-electrode 60 are controlled by mixing the carbon powder to the slurry forming the fuel-electrode green body 6.

Other functions and operations of the obtained solid-electrolyte fuel cell 20 are the same as those of the embodiment 1.

As described above, in this method, the water forming the solvent of slurry is sucked in the mold 4 so that the electrolyte green body 5 and the fuel-electrode green body 6 are formed under the stable condition so as not to produce the crack and peeling-off. In addition, the shrinkage factor of the fuel-electrode green body 6 can be approximated to a shrinkage factor of the electrolyte green body 5 having a roughly constant shrinkage factor by determining the quantity of carbon powder appropriately, so that the occurrence of the crack and peeling-off can be prevented more positively. Further, the porosity of the fuel-electrode 60 can also be controlled by determining the grain size of carbon powder appropriately. Moreover, the solid-electrolyte film 50 and the fuel-electrode 60 can be formed by such a simple process that the slurry is poured into the concave portion 4a of the mold 4 so as to form the electrolyte green body 5 and the fuel-electrode green body 6 and they are sintered, so that this method is carried out easily. Furthermore, the mold 4 and a device for sintering are required at most so that the method can be carried out inexpensively Incidentally, organic powders which are hard to be soluble in water, such as a teflon powder, a vinyl chloride powder, a nylon powder and an acrylic powder etc., may be used in place of the carbon powder.

Embodiment 12

In the planar type and monolithic type batteries, wet methods such as a calendar roll method, a tape casting method and a slurry coating method etc are well known as the manufacturing method for solid-electrolyte fuel cell. The wet method has such advantages as a comparatively good productivity and an inexpensive manufacturing cost, but it has been impossible to apply this method to the tubular type battery. In a manufacturing process of the battery of planar type etc. by means of the wet method, when each layer of electrolyte, electrode and interconnector is to be sintered, it is required to make shrinkage factors of respective layers completely equal at each temperature in the sintering process as diagrammed by FIG. 8, because its sectional structure is fundamentally one-dimensional. For this reason, there has been a possibility of occurrence of warp, crack and breakage etc. before and after sintering, if the shrinkage factors should not be made equal completely. In order to make these shrinkage factors equal, a sintering agent must be added and a material grain size must controlled. Therefore, the manufacturing cost has been expensive.

The manufacturing method of the present embodiment is one which can provide a solid-electrolyte fuel cell inexpensively and without producing the warp, crack and breakage etc., even by means of the wet method, by taking such a measure that a relation of largeness between the shrinkage factor of the electrolyte green body and the shrinkage factor of the green body for forming the electrode is reversed in the midway and at the final of sintering on the basis of a temperature change. The manufacturing method o this embodiment can be applied to any one of the foregoing methods, and has similar function and effect in any one of them. A case where this method is applied to the embodiment 2 will be described hereunder with reference to FIG. through FIG. 3 and FIG. 9 through FIG. 11.

In the first place, the electrode green body 5 is formed in the concave portion 4a of the mold 4 (FIG. 1 and FIG. 2) in the same way as the embodiment 2 (FIG. 3). The air-electrode green body 7 is then formed on the electrolyte green body 5 (FIG. 9) in the same way as the embodiment 2, and the carbon powder is to be previously mixed to the slurry used therefor in this instance. In other words, the slurry for forming the air-electrode green body 7 is composed of the $LaMnO_3$ powder doped with strontium (air-electrode powder), the carbon powder, the zirconia powder added with yttrium oxide forming the stabilizer, the water, the dispersant, the binder and the antifoamer In the next place, the electrolyte-electrode composite 10a is formed (FIG. 10), and the fuel-electrode 60 is then formed so as to make up the solid-electrolyte fuel cell 20a (FIG. in the same way as the embodiment 2. However, the temperature for sintering the electrolyte-electrode composite 10a is to be gradually raised up to 1,600° C., and the relation of largeness between the shrinkage factor of the electrolyte green body 5 and the shrinkage factor of the air-electrode green body 7 is so set as to change in the following manner on the basis of the gradually rising temperature change. Namely, the shrinkage factor of the outside electrolyte green body 5 is larger than the shrinkage factor of the inside air-electrode green body 7 in the midway of sintering, the former is equal to or smaller than the latter at the final of sintering, and the temperature at the final of sintering is in a range of 1,200° C. to 1,600° C. The setting of above change in shrinkage factor is done by appropriately setting a quantity of carbon powder, and the function of carbon powder is the same as that of the embodiment 11.

In the sintering of the above-mentioned embodiment, the shrinkage factor is varied in the midway and at the final of sintering as above-mentioned so that the warp, crack and breakage etc. are not produced.

Figure 49:
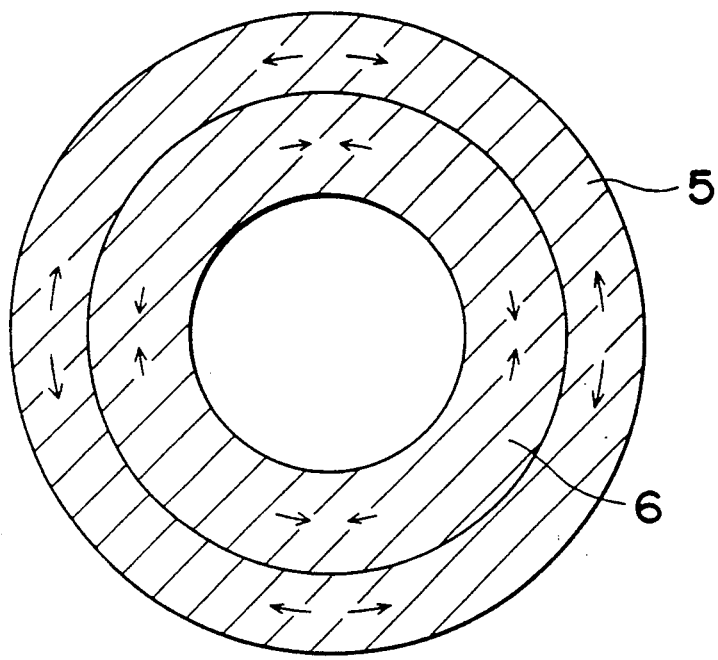
FIG. 49 is a schematic view showing a behavior of stress at time of sintering in the embodiment 12.

A double-layer green body A comprising the electrolyte green body 5 and the air-electrode green body 7 of FIG. 9 has a two-dimensional structure as shown by FIG. 49. Accordingly, in case when the shrinkage factor of the outside electrolyte green body 5 is larger than the shrinkage factor of the inside air-electrode green body 7, a tensile stress is applied in directions of arrows. Since the stress is uniformly applied in a circumferential direction, the crack and breakage are hard to be produced in the process of sintering. However, when the temperature is lowered with this state kept as it is, the crack and breakage will be produced during cooling due to the tensile stress in the directions of arrows. Therefore, when the shrinkage factor of the outside electrolyte green body 5 is made equal to or smaller than the shrinkage factor of the inside air-electrode green body 7 at the final of sintering process, a compression stress will be applied on the outside electrolyte green body 5 during cooling so as to increase a strength of electrolyte green body 5, so that the crack and breakage become hard to be produced.

Since the temperature at the final of sintering is in a range of 1,200° C. to 1,600° C.; the porosity of the air-electrode 70, the density of the solid-electrolyte film 50 and the strength of the electrolyte-electrode composite 10a are satisfied respectively.

Figure 50:
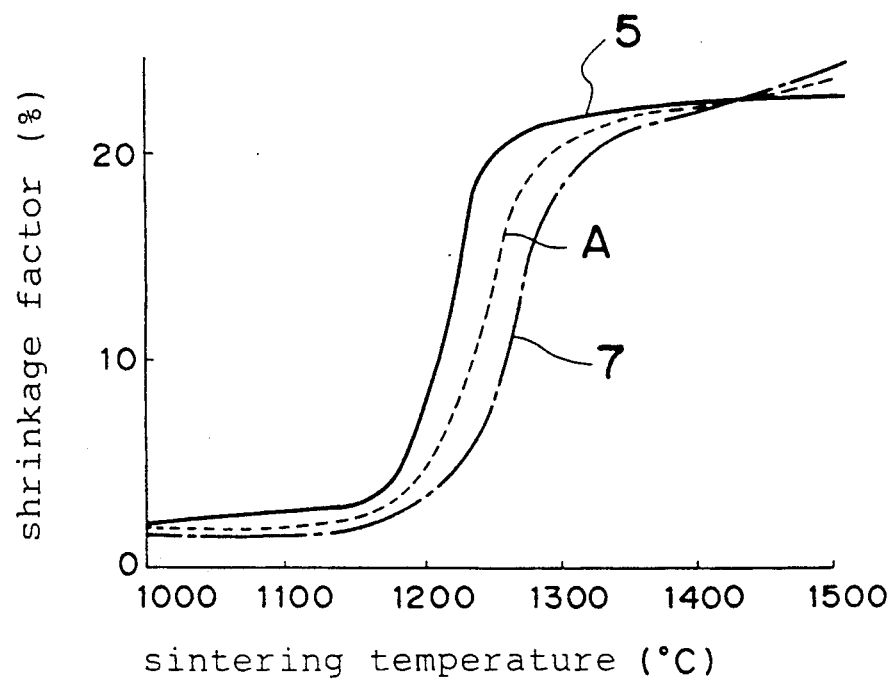
FIG. 50 is a diagram showing a relation between sintering temperatures and shrinkage factors of an electrolyte green body, an electrode green body and a double-layer green body comprising the aboves in the embodiment 12.

FIG. 50 shows changes in shrinkage factors of the double-layer green body A, the electrolyte green body 5 and the air-electrode green body 7, respectively. As seen from this diagram, the shrinkage factor of the electrolyte green body 5 does not concur with the shrinkage factor of the air-electrode green body 7, and they differ each other by about 10% at maximum. However, the warp, crack and breakage were positively prevented by the above-mentioned manufacturing method. Accordingly, the above manufacturing method can be carried out fairly easily as compared with the conventional method where they should be made equal completely.

Other functions and operations of the obtained solid-electrolyte fuel cell 20a are the same as those of the embodiment 2.

As described above, in this manufacturing method, the water forming the solvent of slurry is sucked in the mold 4 so that the electrolyte green body 5 and the air-electrode green body 7 can be formed under the stable condition, and the crack and peeling-off can be prevented. Further, the shrinkage factor of the outside electrolyte green body 5 is made larger than the shrinkage factor of the inside air-electrode green body 7 in the midway of sintering, and the former is made equal to or smaller than the latter at the final of sintering, so that the warp, crack and breakage etc. can be prevented positively. Moreover, this method can be carried out fairly easily and inexpensively as compared with the conventional method in which they should be made completely equal.

Embodiment 13

The manufacturing method of this embodiment is one in which a porous high-molecular film is previously installed on an inside surface of the mold so as to prevent characteristics of the obtained solid-electrolyte fuel cell from being deteriorated due to ingress of components included in the mold. This method is applicable to any one of the foregoing methods, and has similar functions and effects in any one of them. A case where this method is applied to the embodiment 1 will be described hereunder.

Figure 51:
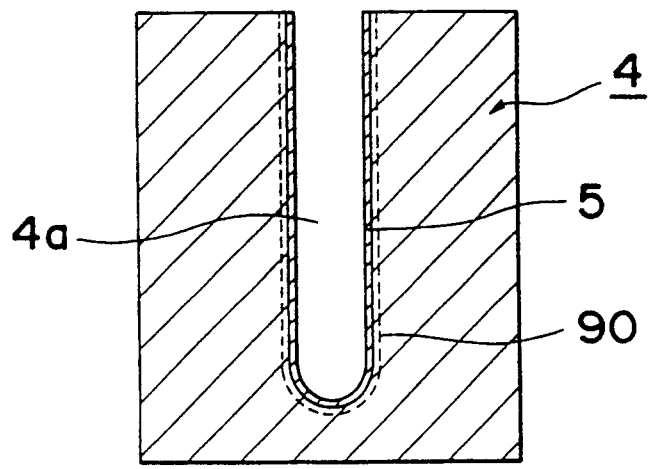
FIG. 51 through FIG. 53 are sectional views for each process of embodiment 13.

In the first place, a porous high-molecular film 90 is installed on an inside surface of the concave portion 4a of the mold 4 made of a plaster as shown by FIG. 51, and the electrolyte green body 5 is formed on it in the same way as the embodiment 1. A material comprising a cellulose-based resin, a teflon-based resin, a polyvinyl-based resin, a nylon-based resin or polyamide-based resin, is used for the high-molecular film 90.

Figure 52:
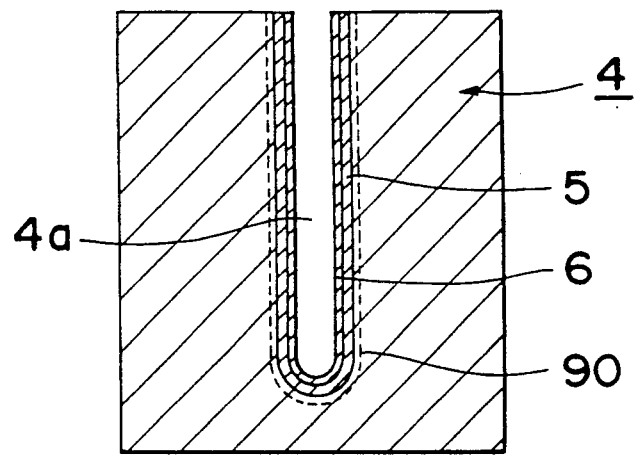
Figure 53:
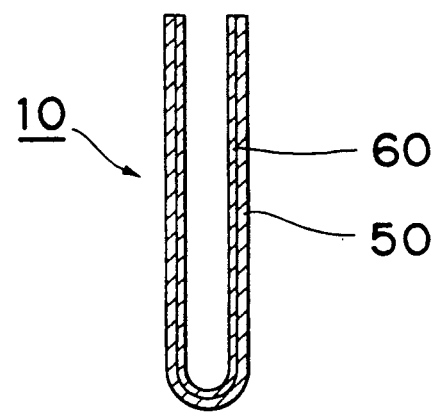

In the next place, as shown in FIG. 52, the fuel-electrode green body 6 is formed on the electrolyte green body 5 in the same way as the embodiment 1. The electrolyte-electrode composite 10 is then formed to make up the air-electrode 70 at an outside of the electrolyte green body 5, so as to make up the solid-electrolyte fuel cell 20 (FIG. 6), as shown by FIG. 53.

Here, calcium sulfate is included in the plaster composing the mold 4. There has been a possibility of ingress of the calcium sulfate into the electrolyte green body 5 and the fuel-electrode green body 6 during forming of them, so as to deteriorate characteristics of the solid-electrolyte film 50 and the fuel-electrode 60. However, in the present embodiment, since the porous high-molecular film 90 is previously installed on the inside surface of the concave portion 4a of the mold 4 as shown by FIG. 51, a movement of the calcium sulfate from the mold 4 to the electrolyte green body 5 and the fuel-electrode green body 6 is prevented by the high-molecular film 90 physically. Namely, the calcium sulfate do not enter the electrolyte green body 5 and the fuel-electrode green body 6, so that the characteristics of the solid-electrolyte film 50 and the fuel-electrode 60 are prevented from being deteriorated. Further, other components in the mold 4 are also physically prevented from moving by the high-molecular film 90, so that affects of the other components on the characteristics are also avoided.

Figure 54:
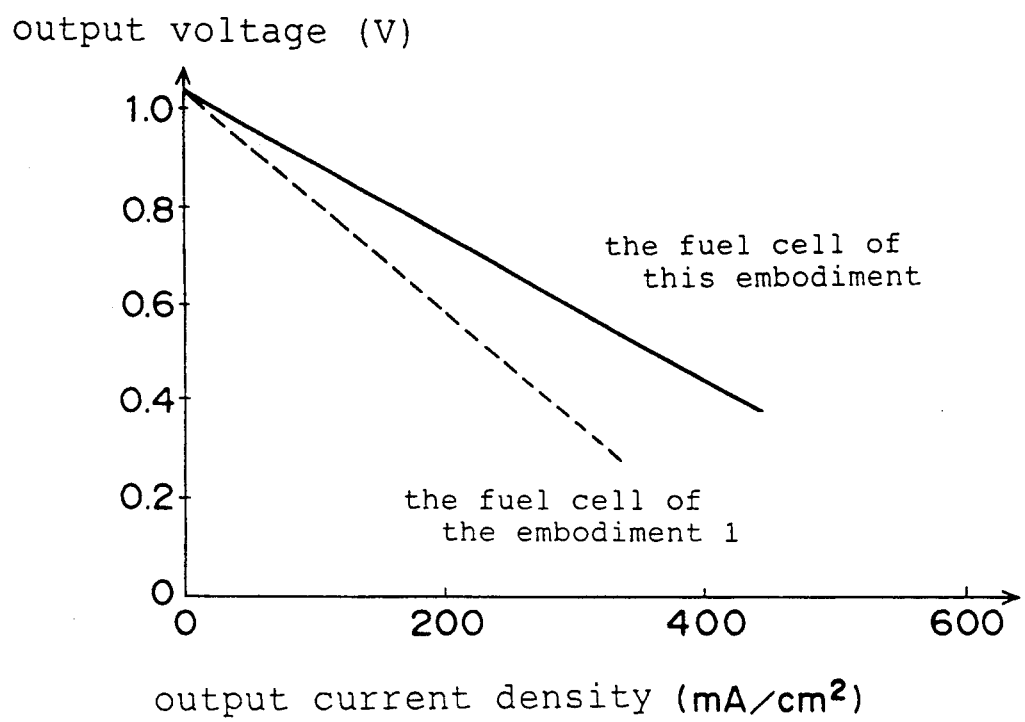
FIG. 54 is a diagram showing a relation between output current densities and output voltages of solid-electrolyte fuel cells obtained by the embodiment 13 and the embodiment 1.
Figure 55:
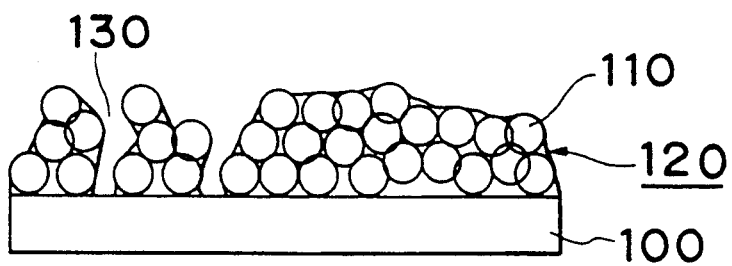
FIG. 55 is a sectional view showing a solid-electrolyte film obtained by a conventional manufacturing method for solid-electrolyte film.

Characteristics of the solid-electrolyte fuel cell 20 (of this embodiment) prepared by the present manufacturing method and those of the solid-electrolyte fuel cell 20 (of the embodiment 1) prepared without using the high-molecular film 90, i.e. by the manufacturing method of the embodiment 1 were compared and investigated. Namely, the both cells 20 were put under a working temperature of 1,000° C., 3% humidified hydrogen was supplied to the fuel-electrode 60 side and air was supplied to the air-electrode 70 side, so that a relation between an output current density and an output voltage was investigated. FIG. 54 shows the result. As seen from FIG. 54, the fuel cell of the present embodiment has a better relation between the output current density and the output voltage. From disassembly of and investigation into the both cells, the following facts were found in the fuel cell of the embodiment 1 that an existence of calcium was recognized and a formation of CaZrO$_3$ was specially recognized on an interface between the solid-electrolyte film 50 and the air-electrode 70. However, the calcium and CaZrO$_3$ were not found in the fuel cell of this embodiment. The reason why the relation between the output current density and the output voltage in the fuel cell of the embodiment 1 is inferior to that of the fuel cell of the present embodiment, may be attributable to a phenomenon that the CaZrO$_3$ functions as an electrical resistant layer.

As described above, in the manufacturing method of this embodiment, the characteristics of the prepared solid-electrolyte fuel cell 20 can be prevented from being deteriorated due to the components in the mold 4, especially the calcium sulfate, so that the solid-electrolyte fuel cell 20 having a high performance can be obtained. Other functions and effects are the same as those of the embodiment 1.

Embodiment 14

In the foregoing embodiments, the water is used for the solvent of slurry. On the contrary, an organic solvent is used in the manufacturing method of this embodiment. Thereby, a time required for drying in the manufacturing process can be shortened, and in its turn a manufacturing time can be shortened. The manufacturing method of this embodiment can be applied to any method of the foregoing embodiments by converting the water into the organic solvent, and has similar functions and effects in any one of them. A case where this method is applied to the embodiment 3 will be described hereunder with reference to FIG. 1, FIG. 3, and FIG. 12 through FIG. 15.

In the manufacturing method of this embodiment, ethyl alcohol is used for the organic solvent, and a material having a property to suck the ethyl alcohol, i.e. a plaster, is used for the mold 4 (FIG. 1 and FIG. 2).

In the first place, a slurry which comprises the nickel oxide powder (fuel-electrode powder) forming the metal oxide, the zirconia powder added with yttrium oxide forming the stabilizer, the ethyl alcohol, the dispersant, the binder and the antifoamer, is prepared. That is, the slurry is prepared by using the ethyl alcohol as the solvent. The prepared slurry is then poured into the concave portion 4a of the mold 4 in the same way as the embodiment 3, so as to form the fuel-electrode green body 6 as shown by FIG. 12. In the next place, a slurry similar to the slurry for forming the electrolyte green body 5 of the embodiment 3 is poured onto the fuel-electrode green body 6 before the fuel-electrode green body 6 has been dried up in the same way as the embodiment 3, so as to form the electrolyte green body 5 as shown by FIG. 13.

In the third place, the fuel-electrode green body 6 and the electrolyte green body 5 are dried to form a double-layer green body made up by integrating the both, the mold 4 is then removed therefrom, and the double-layer green body is sintered to form an electrolyte-electrode composite 10b as shown by FIG. 14. In FIG. 14, an outside is the fuel-electrode 60 and an inside is the solid-electrolyte film 50. In the fourth place, the air-electrode 70 is formed on an inside of the solid-electrolyte film 50 of the electrolyte-electrode composite 10b as shown by FIG. 15.

In the above manufacturing method, the solvent of slurry is the ethyl alcohol, so that the fuel-electrode green body 6 and the electrolyte green body 5 are dried in a short time. Further, since the material sucked by the mold 4 is the ethyl alcohol, the mold 4 is also dried in a short time. Therefore, the time required for drying in the manufacturing processes is considerably shortened, and the manufacturing time is in its turn fairly shortened.

As described above, the present manufacturing method is able to shorten the time for drying, so that it can shorten the manufacturing time in its turn. Other functions and effects are the same as those of the embodiment 3.

In case when the present embodiment is applied to the embodiment 11, the used carbon powder and organic powder are the same as those of the embodiment 11.

Industrial Applicability

This invention is usable to a solid-electrolyte fuel cell having a three-layer structure and equipped with a fuel-electrode, an air-electrode and a solid-electrolyte sandwiched between them, and to an easy and inexpensive manufacture of a fuel cell having a high performance.

What is claimed is:

1. A method for manufacturing a solid-electrolyte fuel cell equipped with a fuel-electrode and an air-electrode for its electrodes with a solid-electrolyte sandwiched between said electrodes;

said method comprising the steps of pouring a first slurry into a concave portion of a mold composed of a material having a property for sucking a specified liquid and forming an electrolyte green body, said first slurry being a mixture of a solid-electrolyte powder and said specified liquid, pouring a second slurry into said concave portion and forming an electrode green body on said electrolyte green body and forming a multi-layer green body integrated with said electrolyte green body, said second slurry being a mixture of an electrode powder and said specified liquid, and removing said multi-layer green body from said mold and sintering said removed multi-layer green body;

said electrode green body formed in said concave portion being one or both of a fuel-electrode green body and an air-electrode green body.

2. A method for manufacturing a solid-electrolyte fuel cell equipped with a fuel-electrode and an air-electrode for its electrodes with a solid-electrolyte sandwiched between said electrodes;

said method comprising the steps of pouring a first slurry into a concave portion of a mold composed of a material having a property for sucking a specified liquid and forming an electrolyte green body, said first slurry being a mixture of a solid-electrolyte powder and said specified liquid, pouring a second slurry onto said electrolyte green body in said concave portion of said mold and forming a selected one of a fuel-electrode green body and an air-electrode green body and forming a double-layer green body integrated with said electrolyte green body, said second slurry being a mixture of said selected one of said fuel-electrode powder and said air-electrode powder with said specified liquid, and removing said double-layer green body from said mold and sintering said removed double-layer green body and forming an electrolyte-electrode composite, and forming a coating of the other of said selected said fuel-electrode and said air-electrode on the electrolyte side of said electrolyte-electrode composite.

3. A method for manufacturing solid-electrolyte fuel cell as set forth in claim 2, in which said fuel-electrode green body is formed in said second slurry pouring and said air-electrode is formed in forming said coating.

4. A method for manufacturing a solid-electrolyte fuel cell as set forth in claim 2, in which said air-electrode green body is formed in said second slurry pouring and said fuel-electrode is formed in forming said coating.

5. A method for manufacturing a solid-electrolyte fuel cell as set forth in claim 2, in which said first slurry is poured into said concave portion of said mold after a water resistant and water repellent member is installed on a part of an inside surface of said concave portion of said mold, said pouring of said slurry second is carried out after said water resistant and water repellent member is removed to expose a part of said selected one of said fuel-electrode green body and said air-electrode green body from the electrolyte green body and an interconnector port is formed on said exposed part when said electrolyte-electrode composite is formed an said other of said selected fuel-electrode and air-electrode is formed when said coating is formed, while avoiding said interconnector part.

6. A method for manufacturing a solid-electrolyte fuel cell as set forth in claim 2, in which: prior to said pouring of said second slurry, an open mold having a through hole provided with the same shape as an opening of the concave portion of said mold and a size at least equal to a size of said opening, is positioned on said mold with said through hole in axial alignment with said concave portion, and said second slurry is poured up to the through hole to leave exposed a part of one of the fuel-electrode green body or the air-electrode green body from the electrolyte green body;

thereafter said green body is removed from said mold; and said coating of said other of said selected fuel-electrode and said air-electrode is formed while avoiding said exposed part.

7. A method for manufacturing a solid-electrolyte fuel cell as set forth in claim 5, in which said interconnector part is formed so that a slurry including $LaCrO_3$ or $CoCr_2O_4$ is applied onto the exposed part of said selected one of said fuel-electrode green body and said air-electrode green body exposed from the electrolyte green body, and said green body and said interconnector part are then sintered.

8. A method for manufacturing a solid-electrolyte fuel cell equipped with a fuel-electrode and an air-electrode for its electrodes with a solid-electrolyte sandwiched between said electrodes;

said method comprising the steps of pouring a first slurry into a concave portion of a mold composed of a material having a property for sucking a specified liquid for forming a selected one of a fuel-electrode green body and an air-electrode green body, said first slurry being a mixture of a selected one of a fuel-electrode powder and an air-electrode powder and said specified liquid, pouring a second slurry onto said green body made up in said pouring of said first slurry and forming an electrolyte green body integrated with said green body made up in said first slurry pouring and forming a double-layer green body, said second slurry being made up of a mixture of a solid-electrolyte powder and said specified liquid, removing said double-layer green body from said mold and sintered said removed double-layer green body and forming an electrolyte-electrode composite, and forming a coating of the other of said selected said fuel-electrode and said air-electrode on the electrolyte side of said electrolyte-electrode composite.

9. A method for manufacturing a solid-electrolyte fuel cell as set forth in claim 8, in which said fuel-electrode green body is formed in said first slurry pouring and said air-electrode is formed in forming said coating.

10. A method for manufacturing a solid-electrolyte fuel cell as set forth in claim 8, in which said air-electrode green body is formed in said first slurry pouring and said fuel-electrode is formed in forming said coating.

11. A method for manufacturing a solid-electrolyte fuel cell as set forth in claim 2 or claim 8, in which said fuel-electrode is formed by using $Ni-ZrO_2$ cermet or $Co-ZrO_2$ cermet.

12. A method for manufacturing a solid-electrolyte fuel cell equipped with a fuel-electrode and an air-electrode for its electrodes with a solid-electrolyte sandwiched between said electrodes;

said method comprising the steps of pouring a first slurry into a concave portion of a mold composed of a material having a property for sucking a specified liquid and forming a first green body, said first slurry being a mixture of a powder selected from one of a fuel-electrode powder and an air-electrode powder with said specified liquid, pouring a second slurry onto said first green body formed in said concave portion of said mold and forming a second green body on said first green body in said mold, said second slurry being a mixture of a solid-electrolyte powder and said specified liquid, pouring a third slurry onto said second green body formed in said concave portion of said mold and forming a third green body on said first and second green bodies in said mold, said third slurry being a mixture of a powder selected from the other of said fuel-electrode powder and said air-electrode powder with said specified liquid, and removing said three-layer green body from said mold and sintering said three-layer green body and forming an electrolyte-electrode composite.

13. A method for manufacturing a solid-electrolyte fuel cell as set forth in claim 12, in which a fuel-electrode green body is formed with said first slurry, and an air-electrode green body is formed with said third slurry.

14. A method for manufacturing a solid-electrolyte fuel cell as set forth in claim 12, in which an air-electrode green body is formed with said first slurry, and a fuel-electrode green body is formed in with said third slurry.

15. A method for manufacturing a solid-electrolyte fuel cell as set forth in claim 2, claim 8 or claim 12, in which said specified liquid is water, and said mold comprises a material having a water absorptivity.

16. A method for manufacturing a solid-electrolyte fuel cell as set forth in claim 2, claim 8 or claim 12, in which said specified liquid is an organic solvent evaporated more quickly than water, and said mold comprises a material having a property for sucking said organic solvent.

17. A method for manufacturing a solid-electrolyte fuel cell as set forth in claim 16, in which said organic solvent is ethyl alcohol.

18. A method for manufacturing a solid-electrolyte fuel cell as set forth in claim 2, claim 8 or claim 12, in which relative shrinkage factor of said electrolyte green body and shrinkage factors of said formed fuel-electrode green body and said air-electrode green body, are reversed midway and at the final sintering as sintering temperature is gradually raised to a specified value during sintering.

19. A method for manufacturing a solid-electrolyte fuel cell as set forth in claim 18, in which temperature at a final stage of sintering is from 1,200° C. to 1,600° C.

20. A method for manufacturing a solid-electrolyte fuel cell as set forth in claim 2, claim 8 or claim 12, in which material selected from carbon powder and an organic powder, difficult to be dissolved in said specified liquid is mixed in the slurry including the fuel-electrode powder slurry and the air-electrode powder slurry, and sintering is carried out under an atmosphere including oxygen.

21. A method for manufacturing a solid-electrolyte fuel cell as set forth in claim 20, in which said organic powder is selected from one or more of teflon powder, vinyl chloride powder, nylon powder and an acrylic powder.

22. A method for manufacturing a solid-electrolyte fuel cell as set forth in claim 2, claim 8 or claim 12, in which a porous high-molecular film is previously installed on an inside surface of said concave portion of said mold before said first slurry is poured.

23. A method for manufacturing a solid-electrolyte fuel cell as set forth in claim 22, in which said porous high-molecular film comprises a cellulose-based resin, a teflon-based resin, a polyvinyl-based resin, a nylon-based resin or a polyamide-based resin.

24. A method for manufacturing a solid-electrolyte fuel cell as set forth in claim 2, claim 8 or claim 12, in which said solid-electrolyte powder is a zirconia powder containing a stabilizer and comprising one or a mixture of a stabilized zirconia, a cubic zirconia, a tetragonal zirconia or a partial stabilized zirconia.

25. A method for manufacturing a solid-electrolyte fuel cell as set forth in claim 24, in which said stabilizer is yttrium oxide, calcium oxide, scandium oxide, ytterbium oxide, neodymium oxide or gadolinium oxide.

26. A method for manufacturing a solid-electrolyte fuel cell as set forth in claim 2, claim 8 or claim 12, in which said fuel-electrode powder is a powder of metal or metal oxide, said metal being nickel or cobalt, and said metal oxide being a nickel oxide or a cobalt oxide.

27. A method for manufacturing a solid-electrolyte fuel cell as set forth in claim 2, claim 8 or claim 12, in which said air-electrode powder is a powder of complex oxide of perovskite, and said complex oxide is $LaMnO_3$, $LaCoO_3$, or $CaMnO_3$ added with rare earth or alkaline earth metals.

* * * * *